United States Patent [19]

Strandjord et al.

[11] Patent Number: 5,781,300
[45] Date of Patent: Jul. 14, 1998

[54] BACKSCATTER ERROR REDUCER FOR INTERFEROMETRIC FIBER OPTIC GYROSCOPE

[75] Inventors: Lee K. Strandjord, Tonka Bay, Minn.; Glen A. Sanders, Scottsdale, Ark.; Bogdan Szafraniec, Cave Creek, Ark.; Ralph A. Bergh, Phoenix, Ark.

[73] Assignee: Honeywell Inc., Minneapolis, Minn.

[21] Appl. No.: 741,464

[22] Filed: Oct. 31, 1996

[51] Int. Cl.$^6$ ....................................................... G01C 19/72
[52] U.S. Cl. ....................................................... 356/350
[58] Field of Search .............................. 356/350; 385/12, 385/14

[56] References Cited

U.S. PATENT DOCUMENTS 4,645,345  2/1987  Domann ...................... 356/350

OTHER PUBLICATIONS

G.A.Sanders, "Critical Review of Resonator Fiber Optic Gyroscope Technology", Proc.SPIE Fiber Optic and Laser Sensors X, (Sep. 1992, Boston, Mass.), vol. CR44, pp. 133–159.

G.A.Sanders M.G.Prentiss and S.Ezekiel, "Passive Ring Resonator method for Sensitive Inertial Rotation Measurements in Geophysics and Relativity", Opt.Letts., Nov. 1981, vol.6,No.11, pp. 569–571.

G. Domann, "Fiber Gyro with High Birefrengent Fiber and Integrated Optics Phase Shifter", IEEE Conf.Pub. #227, 2nd European Conf on Integrated Optic, Florence, Italy, Oct. 83, pp. 156–158.

*Primary Examiner*—Samuel A. Turner
*Attorney, Agent, or Firm*—John G. Shudy, Jr.; Ronald E. Champion

[57] ABSTRACT

A backscatter or secondary wave error reducer for an interferometric fiber optic gyroscope having at least one phase modulator for receiving a square wave bias phase modulation signal and a sine wave carrier suppression modulation signal. The amplitude of the carrier suppression modulation signal is sufficient to greatly reduce the interference between two sets of backscattered or secondary waves of light originating in the Sagnac loop of the gyroscope. Reduction or elimination of the interference of the two sets of secondary waves reduces or eliminates the secondary wave induced rotation rate sensing error. The frequency of the carrier suppression signal is near or equal to an even harmonic of the proper frequency of the Sagnac loop to reduce the sinusoidal or periodic rotation rate sensing error caused by the carrier suppression modulation signal.

19 Claims, 17 Drawing Sheets

BACKSCATTER ERROR REDUCER FOR INTERFEROMETRIC FIBER OPTIC GYROSCOPE

BACKGROUND OF THE INVENTION

The present invention pertains to interferometric fiber optic gyroscopes (IFOGs), and particularly to IFOGs having backscatter error sources in the optical fiber sensing loop and in the integrated optical circuit (IOC) which incorporates a light beam splitter and combiner, and at least one phase modulator. More particularly, the present invention pertains to the reduction of one kind of backscatter error.

Two types of backscatter error mechanisms are interference between the primary wave and backscattered wave and interference between the two counter-propagating backscattered waves or secondary waves at the gyroscope output at the photodetector. In the literature the former has been considered the fundamental IFOG backscatter error mechanism, and therefore has been studied in some detail. However, many commonly employed design features (i.e., short coherence light sources, bias modulation at the proper frequency, loop coupler having a near 50/50 splitting ratio and a demodulator having good quadrature rejection) have made this error negligible for all types of IFOGs. The latter backscatter error mechanism has been considered a second order effect, which is of significant concern in high accuracy IFOGs, and thus has not been rigorously dealt with to date.

SUMMARY OF THE INVENTION

The present invention is a solution to the second order backscatter error problems in an interferometric fiber optic gyroscope.

The solution is a backscatter error reducer for an interferometric fiber optic gyroscope having at least one phase modulator for receiving at least two phase modulation signals. One signal is the bias phase modulation and the other is a carrier suppression phase modulation. The bias modulation signal is for normal operation. The carrier phase modulation signal has an amplitude such that the modulator generates at least one radian of phase difference between the two sets of secondary waves to reduce the interference between the two sets of backscatter or secondary waves of light originating in the Sagnac loop of the gyroscope.

DESCRIPTION OF THE PREFERRED EMBODIMENTS

Figure 1:
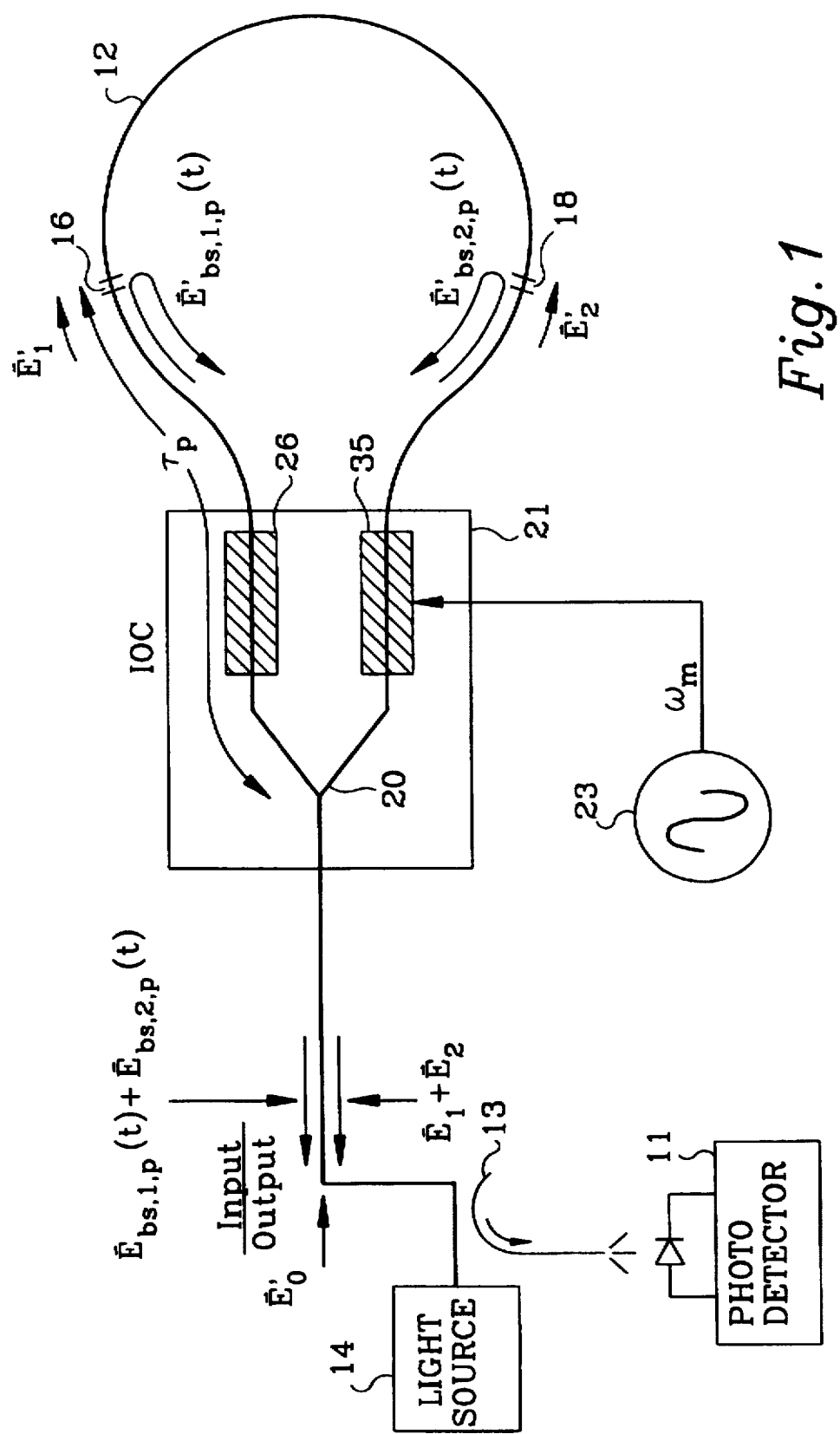
FIG. 1 shows a basic interferometric gyroscope and the Rayleigh backscatter wave paths.

The second order backscatter error mechanism (Rayleigh backscatter) is illustrated in FIG. 1. Because of microscopic variations in the refractive index of a loop fiber 10, the primary waves $\vec{E}'_1$ and $\vec{E}'_2$ propagating through the loop fiber 12 will produce backscatter waves in the opposite directions. Backscattered waves $\vec{E}'_{bs,1,p}(t)$ and $\vec{E}'_{bs,2,p}(t)$ are assumed to originate from a pair of fiber sections 16 and 18 having a length equal to the coherence length $L_c$ of a light source 14 and at a location in the fiber loop 12 having an index p.

Since the pair of scattering sections 16 and 18 have equal distance from a y-junction 20 of integrated optics chip (IOC) 21, the backscattered waves will coherently interfere at the IOC 21 input/output. The physical paths of the primary waves and the interfering backscattered waves at photodetector 11 via coupler 14 resemble a Michelson interferometer, thus the resulting error is also referred to as a Michelson error.

The scattered fields $\vec{E}_{bs,1,p}(t)$ and $\vec{E}_{bs,2,p}(t)$ at the y-junction input/output are:

$$\vec{E}_{bs,1,p}(t) = \alpha^{1/2} E_{bs} e^{-j(\omega t + \psi_{1,p}(t))} \tag{1}$$

$$\vec{E}_{bs,2,p}(t) = \alpha^{1/2} E_{bs} e^{-j(\omega t + \Phi_m \sin[\omega_m t] + \Phi_m \sin[\omega_m t - 2\omega_m \tau_p] + \psi_{2,p}(t))} \tag{2}$$

where $\alpha$ is the lumped optical loss from the input/output to scattering section 16 or 18, $\omega$ is the angular frequency of source 14, $\Phi_m$ is the amplitude of the bias phase modulation from generator 23, applied to one of the primary waves, $\omega_m$ is the bias modulation frequency, and $\tau_p$ is the transit time from the scattering sections 16 and 18 to y-junction 20. The amplitude $E_{bs}$ of the scattered fields is assumed to be constant with time and the same for all scattering sections like those of sections 16 and 18. The phases $\psi_{1,p}(t)$ and $\psi_{2,p}(t)$ of the scattered fields are assumed to vary randomly with time (due to changes in the propagation constant of the fiber) and can be different for each scattering section.

There are p coherence lengths ($L_c$) that fit within the physical distance between y-junction 20 and scattering section p. The transit time $\tau_p$ can be expressed as $$\tau_p = \frac{pnL_c}{c} \qquad (3)$$

where n is the index of refraction of the fiber and c is the speed of light. To simplify the remaining expressions the phase difference $\Delta\psi_p(t)$ is defined as $$\Delta\psi_p(t) = \psi_{1,p}(t) - \psi_{2,p}(t) \qquad (4)$$

and the backscatter intensity $I_{bs}$ as $$I_{bs} = E_{bs}^2. \qquad (5)$$

The intensity $I_{bs,p}(t)$ of the interfering scattered waves is $$I_{bs,p}(t) = 2\alpha I_{bs}\{1 + \cos|2\Phi_m \cos(\omega_m\tau_p)\sin(\omega_m t - \omega_m\tau_p) + \Delta\psi_p(t)|\}. \qquad (6)$$

The cosine function in Equation 6 can be rewritten as $$\cos|2\Phi_m \cos(\omega_m\tau_p)\sin(\omega_m t - \omega_m\tau_p) + \Delta\psi_p(t)| = \cos|\Delta\psi_p(t)|\cos|2\Phi_m \cos(\omega_m\tau_p)\sin(\omega_m t - \omega_m\tau_p)| - \sin|\Delta\psi_p(t)|\sin|2\Phi_m \cos(\omega_m\tau_p)\sin(\omega_m t - \omega_m\tau_p)|. \qquad (7)$$

Expanding the terms in Equation 7 as a series of Bessel functions and using Equation 6, we find that the second term in Equation 7 represents in-phase and quadrature error signals that are synchronous with the bias modulation and have the frequency $\omega_m$. The amplitude of the in-phase error signal is $$I_{bs,sig,p}(t) = -4\alpha I_{bs}\sin|\Delta\psi_p(t)|J_1|2\Phi_m \cos(\omega_m\tau_p)|\cos(\omega_m\tau_p) \qquad (8)$$

and the amplitude of the quadrature error signal is $$I_{bs,quad,p}(t) = 4\alpha I_{bs,rms}\sin|\Delta\psi_p(t)|J_1|2\Phi_m \cos(\omega_m\tau_p)|\sin(\omega_m\tau_p). \qquad (9)$$

Equation 8 represents the error signal due to light scattering from only one pair of scattering sections 16 and 18. To find the net error $I_{err,sig}$ due to all scattering section pairs, one takes the root-sum-square of the peak amplitudes of $I_{bs,sig,p}(t)$ for all p. The peak amplitude (denoted by $\langle I_{bs,sig,p}\rangle$) is $$\langle I_{bs,sig,p}\rangle = 4\alpha J_1|2\Phi_m \cos(\omega_m\tau_p)|\cos(\omega_m\tau_p) \qquad (10)$$

and the net in-phase intensity error is $$I_{err,sig} = \sqrt{\sum_{p=1}^{N}(I_{bs,sig,p})^2} \qquad (11)$$

where N is the number of pairs of scattering sections that fit within fiber loop 12 of length L $$N = \frac{L}{L_c}. \qquad (12)$$

Using Equations 8, 10 and 12, one can rewrite Equation 11 as $$I_{err,sig} = 4\alpha I_{bs}\sqrt{\sum_{p=1}^{N}(J_1|2\Phi_m\cos(\omega_m\tau_p)|\cos(\omega_m\tau_p))^2} \qquad (13)$$

If $I_{bs,sig,p}(t)$ can be characterized as having a 1/f power spectral density, then the net error signal will not be a function of integration time, and therefore the resulting rotation rate error will be a bias instability error. There are data in the related art that shows that the instantaneous intensity of interfering Rayleigh backscatter waves does have a 1/f power spectral density for some types of optical systems. This does not mean that Rayleigh backscatter in IFOGs will have exactly the same statistical nature. There are many things that can influence the power spectral density of the backscatter error, such as the thermal and vibration environment of sensing coil 12. To simplify this analysis, one considers only the case where the backscatter error has a 1/f power spectral density.

Operating at the proper frequency allows the bias modulation frequency to be written as $$\omega_m = \frac{\pi c}{nL}. \qquad (14)$$

Figure 2:
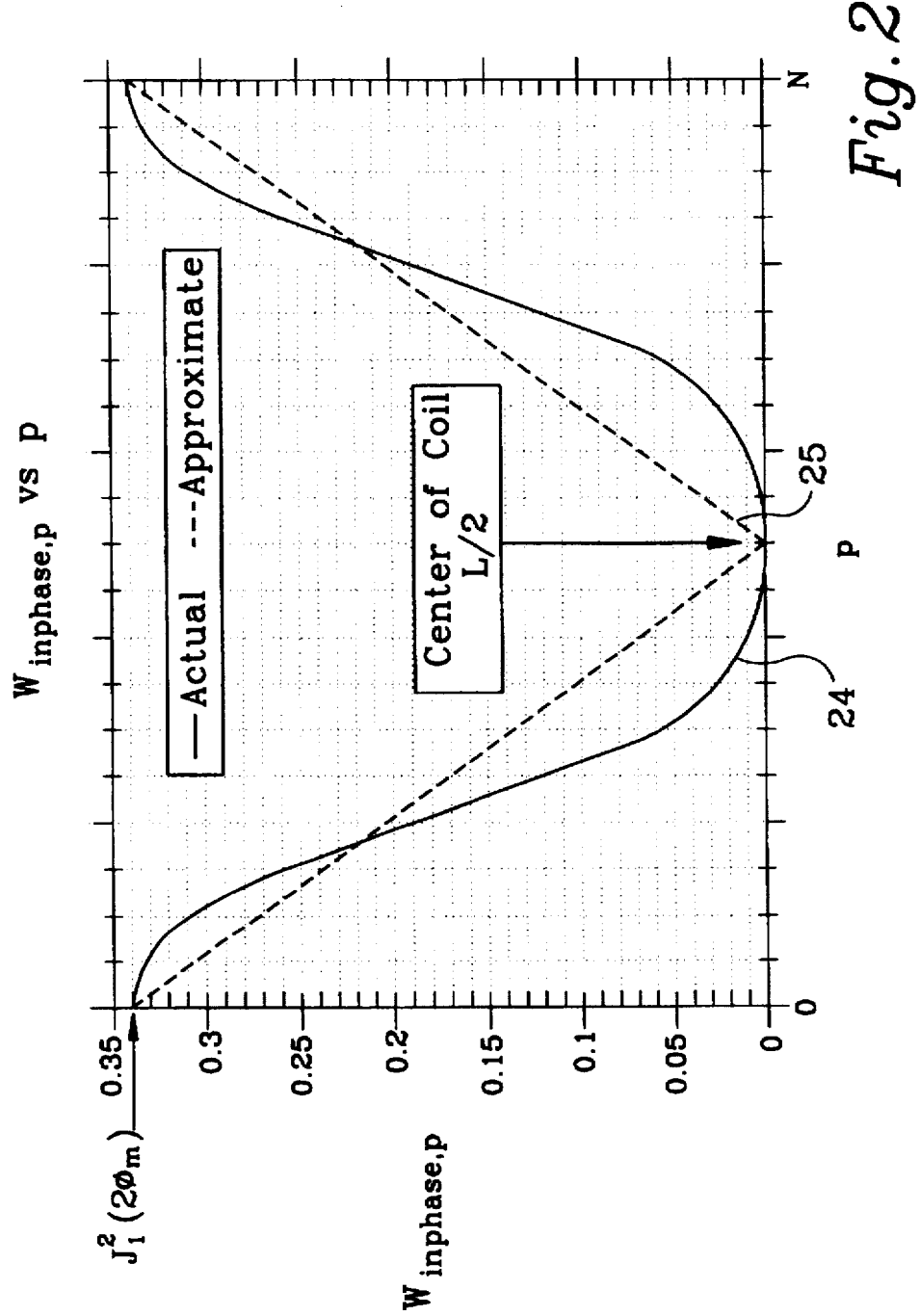
FIG. 2 is a graph that shows how much backscatter contributes to net error of the gyroscope rotation rate indication, relative to location in the Sagnac loop where the backscatter originates.

The function $W_{inphase,p}$ is defined as the argument of the summation in Equation 13

$$W_{inphase,p} = \left(J_1\left[2\Phi_m\cos\left(p\pi\frac{L_c}{L}\right)\right]\cos\left(p\pi\frac{L_c}{L}\right)\right)^2 \qquad (15)$$

where Equation 14 has been substituted for the bias modulation frequency. This function determines how much a particular pair of scattering sections contribute to the net error $I_{err,sig}$. A plot 24 of this function shown in FIG. 2 shows that backscatter originating near IOC 21 contributes more to the net error then backscatter originating from the center of fiber loop 12. This error model does not include weighting effects associated with distributed optical loss in the fiber, which will reduce $W_{inphase,p}$ as a function of p. If these effects were included, then curve 24 in FIG. 2 would be asymmetric about the center of fiber loop 12 and the area under the right-hand-side of curve 24 would be less than the area under the left-hand-side of curve 24. Also shown in FIG. 2 is a plot of a linear function 25. The area under linear curve 25 approximates the area under $W_{inphase,p}$. The value of the summation in Equation 13 is proportional to the area under "actual" curve 24 in FIG. 2.

A plot of the function $W_{inphase,p}$ vs. p for $2\Phi_m = 1.8$ shows that backscatter originating near integrated optics chip 21 contributes more to the net error $I_{err,sig}$ then backscatter originating from the center of fiber loop 12. "approximation" curve 25 over-estimates the area under "actual" curve 24 by about 10%, which is much better than what one needs for this error analysis. The linear approximations for the summation in Equation 13 are:

$$\sum_{p=1}^{N/2} W_{inphase,p} = \sum_{p=1}^{N/2}\left(J_1^2[2\phi_m] - \frac{J_1^2|2\phi_m|}{N/2} p\right) \qquad (16)$$

$$\sum_{p=N/2+1}^{N} W_{inphase,p} = \sum_{p=N/2+1}^{N}\left(-J_1^2|2\phi_m| + \frac{J_1^2|2\phi_m|}{N/2} p\right). \qquad (17)$$

The summation in Equation 17 can be written as $$\sum_{p=N/2+1}^{N} W_{inphase,p} = \sum_{p=1}^{N/2}\frac{J_1^2(2\phi_m)}{N/2} p. \qquad (18)$$

and therefore the summation in Equation 13 can be written as $$\sum_{p=1}^{N} W_{inphase,p} = \sum_{p=1}^{N/2} W_{inphase,p} + \sum_{p=N/2+1}^{N} W_{inphase,p} = \frac{NJ_1^2(2\phi_m)}{2} \quad (19)$$

From Equations 11,13,15 and 19, one finds that the net error signal is approximately $$I_{err,sig} = 2\sqrt{2} \, \alpha I_{bs} J_1 |2\phi_m| \sqrt{\frac{L}{L_c}} \quad (20)$$

To determine the rotation rate error due to the error signal one needs to find how much rotation will give an equivalent signal. The electric fields of the primary waves emanating from IOC 21 input/output are:

$$\vec{E}_1 = \alpha E_0 e^{i(\omega t + \Phi_m \sin (\omega_m t) + \Phi_R/2)} \quad (21)$$

$$\vec{E}_2 = \alpha E_0 e^{i(\omega t + \Phi_m \sin (\omega_m t - \omega_m \tau) - \Phi_R/2)} \quad (22)$$

where $\Phi_R$ is the phase delay due to rotation. By operating at the proper frequency, the bias modulation frequency can be written as $$\omega_m = \frac{\pi}{\tau} \quad (23)$$

where $\tau$ is the transit time through fiber loop 12. The intensity due to interference of the main waves at IOC 21 input/output is $$I_{main} = 2\alpha^2 E_0^2 \{1 + \cos [2\Phi_m \sin (\omega_m t) + \Phi_R]\}. \quad (24)$$

By using trigonometric identities and expanding Equation 24 in a series of Bessel functions, the rotation rate signal $I_{sig}$ that occurs at the bias modulation frequency is $$I_{sig} \approx 4\alpha^2 E_0^2 J_1(2\Phi_m)\Phi_R. \quad (25)$$

The phase delay due to rotation $\Omega$ is $$\phi_R = \frac{2\pi LD}{\lambda c} \Omega \quad (26)$$

where D is the diameter of the sensing coil and $\lambda$ is the wavelength of the source. The backscatter intensity from a fiber section of length $L_c$ is $$I_{bs} = \eta_{fiber} \alpha I_0 L_c \quad (27)$$

where $\eta_{fiber}$ is the captured fractional Rayleigh backscatter per unit length and the product $\alpha I_0$ is the intensity of the primary wave in fiber loop 12. To determine the rotation error due to the backscatter error signal one finds the rotation that will produce a signal that is equivalent to the backscatter error signal $$I_{sig} = I_{err,sig}. \quad (28)$$

Combining Equations 20, 25, 26, 27 and 28, one finds the rotation rate error $\Omega_{err}$ due to the Rayleigh backscatter is $$\Omega_{err,fiber} = \frac{\lambda c \eta_{fiber}}{2\sqrt{2} \, \pi D} \sqrt{\frac{L_c}{L}}. \quad (29)$$

Equation 29 shows that $\Omega_{err,fiber}$ decreases with longer fiber lengths and sources with shorter coherence lengths. For a typical navigation grade IFOG operating at a source wavelength of 0.83 µm the rotation rate error is $$\Omega_{err,fiber} = \frac{0.83 \times 10^{-6}\text{m} \times 3 \times 10^8 \text{m} \cdot \text{s}^{-1} \times 7.7 \times 10^{-7}\text{m}^{-1}}{2\sqrt{2} \, \pi \times 0.0635\text{m}} \sqrt{\frac{20 \times 10^{-6}\text{m}}{1 \times 10^3 \text{m}}} \frac{180 \text{deg}}{\pi} \frac{3600 \text{s}}{hr} = 0.01 \text{deg}/hr \quad (30)$$

For a high-performance IFOG operating at a source wavelength of 1.55 µm the rotation rate error is $$\Omega_{err,fiber} = \frac{1.55 \times 10^{-6}\text{m} \times 3 \times 10^8 \text{m} \cdot \text{s}^{-1} \times 6.3 \times 10^{-8}\text{m}^{-1}}{2\sqrt{2} \, \pi \times 0.15\text{m}} \sqrt{\frac{20 \times 10^{-6}\text{m}}{4 \times 10^3 \text{m}}} \frac{180 \text{deg}}{\pi} \frac{3600 \text{s}}{hr} = 0.0003 \text{deg}/hr \quad (31)$$

Equations 30 and 31 show that the rotation rate error due to Rayleigh backscatter from loop fiber 12 is more significant for a navigation grade IFOG operating at a source wavelength of 0.83 µm. One reason for this is the Rayleigh backscatter is significantly higher at this wavelength than at longer wavelengths.

The present invention incorporates carrier suppression modulation to suppress backscatter errors in IFOGs. By applying a sinusoidal phase modulation to one of two optical waves that is producing the backscatter, the interference between the backscatter waves is "scrambled". The amplitude of the phase modulation is adjusted such that the carrier of the optical wave (optical energy occurring at the source, or baseband, frequency) is suppressed. Therefore, interference between the two backscatter waves will have frequency components at multiple integers of the carrier suppression modulation frequency and no interference will occur at the baseband frequency. The final result is that backscatter errors will be frequency shifted from baseband to multiple integers of the carrier suppression modulation frequency and will average to zero over time.

To understand how carrier suppression works for the IFOG one considers a sinusoidal phase modulation, having an amplitude $\Phi_s$ and a angular frequency $\omega_s$, applied to modulator 35 or another phase modulator 26 shown in FIG. 1. The electric fields of the scattered waves at IOC 21 input/output are:

$$\vec{E}_{bs,1,p}(t) = \alpha^{1/2} E_{bs} e^{i(\omega t + \Phi_s \sin [\omega_s t] + \Phi_m \sin [\omega_m t - 2\omega_s \tau] + \psi_{1,p}(t))} \quad (32)$$

$$\vec{E}_{bs,2,p}(t) = \alpha^{1/2} E_{bs} e^{i(\omega t + \Phi_m \sin [\omega_m t] + \Phi_m \sin [\omega_m t - 2\omega_m \tau_p] + \psi_{2,p}(t))} \quad (33)$$

The intensity $I_{bs,p}(t)$ due to the scattered waves is $$I_{bs,p}(t) = 2\alpha I_{bs} \{1 + \cos |\Delta\psi(t)| \cos [2\Phi_m \cos (\omega_m \tau_p) \sin (\omega_m t - \omega_m \tau_p)]$$
$$\cos [2\Phi_s \cos (\omega_s \tau_p) \sin (\omega_s t - \omega_s \tau_p)] + \cos |\Delta\psi(t)| \sin [2\Phi_m \cos$$
$$(\omega_m \tau_p) \sin (\omega_m t - \omega_m \tau_p)] \sin [2\Phi_s \cos (\omega_s \tau_p) \sin (\omega_s t - \omega_s \tau_p)] - \sin$$
$$|\Delta\psi(t)| \cos [2\Phi_m \cos(\omega_m \tau_p) \sin (\omega_m t - \omega_m \tau_p)] \cos [2\Phi_s \cos$$
$$(\omega_s \tau_p) \sin (\omega_s t - \omega_s \tau_p)] + \sin |\Delta\psi(t)| \sin [2\Phi_m \cos (\omega_m \tau_p) \sin$$
$$(\omega_m t - \omega_m \tau_p)] \cos [2\Phi_s \cos (\omega_s \tau_p) \sin (\omega_s t - \omega_s \tau_p)]\} \quad (34)$$

By expressing the terms in Equation 34 as a series of Bessel functions, one finds that the fourth term is the only term that has a signal that is synchronous with the bias modulation. From Equation 34 the in-phase error signal is found to be $$I_{bs,sig,p} = -4\alpha I_{bs} \sin|\Delta\psi(t)||J_0|2\Phi_s \cos(\omega_s\tau_p)|J_1|2\Phi_m \cos(\omega_m\tau_p)| \cos(\omega_m\tau_p) \quad (35)$$

and the quadrature error signal is $$I_{bs,quad,p} = 4\alpha I_{bs} \sin|\Delta\psi(t)||J_0|2\Phi_s \cos(\omega_s\tau_p)|J_1|2\Phi_m \cos(\omega_m\tau_p)| \sin(\omega_m\tau_p). \quad (36)$$

By applying a carrier suppression phase modulation in addition to the bias modulation, an unwanted rate signal occurring at the frequency of the suppression modulation is produced. To reduce the amplitude of the unwanted rate signal, the frequency of the carrier suppression modulation can be set very low relative to the proper frequency or can be set near multiple integers of twice the proper frequency. If one considers the case where the carrier suppression modulation is at a frequency much less than the proper frequency then $$\omega_s << \omega_m. \quad (37)$$

The effects of the transit time $\tau_p$ is removed for this case since $$\cos(\omega_s\tau_p) \approx 1 \text{ for all } p. \quad (38)$$

The rotation rate error corresponding to low frequency carrier suppression is $$\Omega_{err,fiber} = |J_0(2\phi_s)| \frac{\lambda c \eta}{2\sqrt{2} \, \pi D} \sqrt{\frac{L_c}{L}} \quad (39)$$

Figure 3:
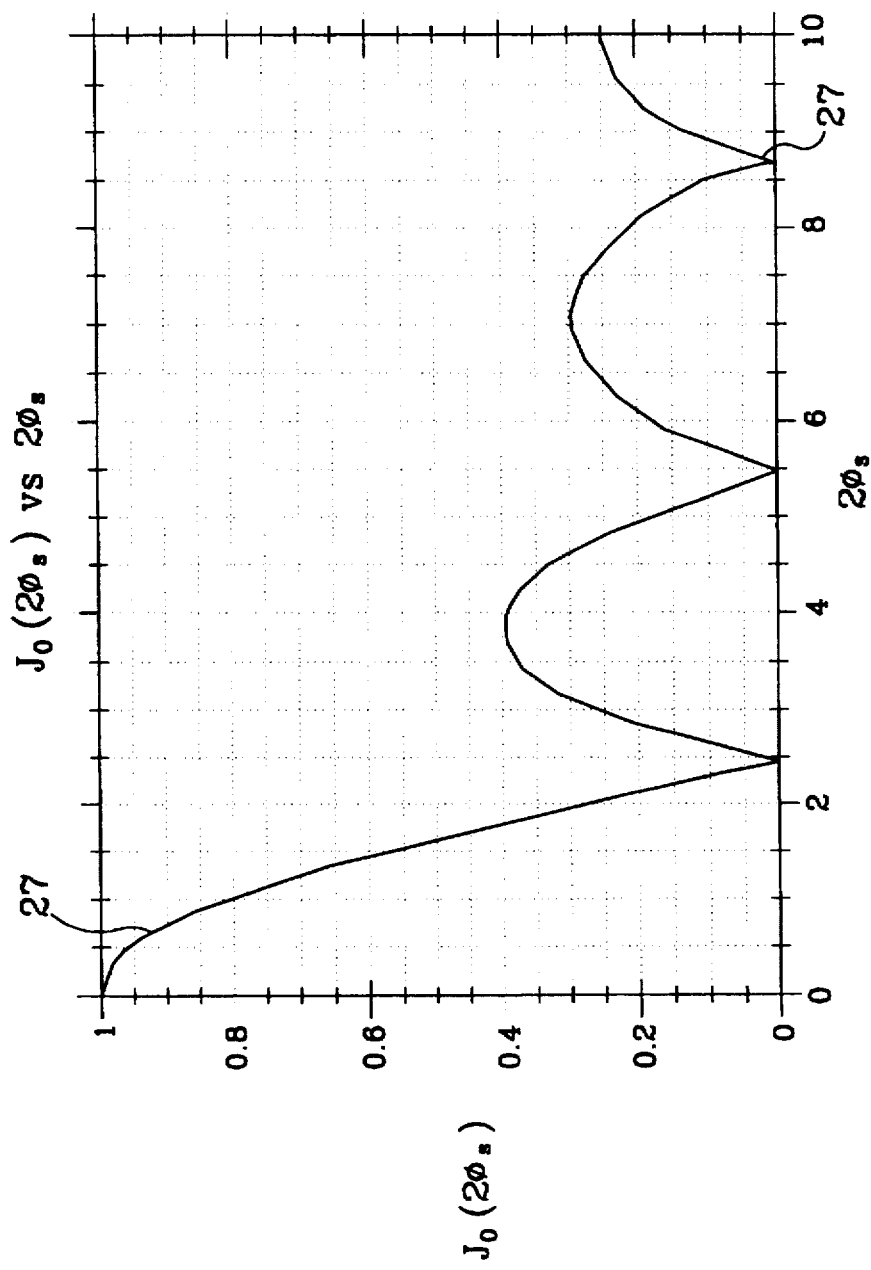
FIG. 3, where the rotation rate error depends on the absolute value of the Bessel function, reveals a graph of the Bessel function relative to amplitude difference of the at least two phase modulations of the light beams in the gyroscope.

Equation 39 shows that $\Omega_{err,fiber}$ depends on the absolute value of the Bessel function $J_0(2\Phi_s)$. A plot 27 of the Bessel function $J_0(2\Phi_s)$ vs. $2\Phi_s$ is shown in FIG. 3. Plot 27 shows that the rotation rate error due to backscatter can be significantly reduced by employing a relatively low frequency carrier suppression modulation having an appropriate amplitude of about 2.4 radians.

Figure 4:
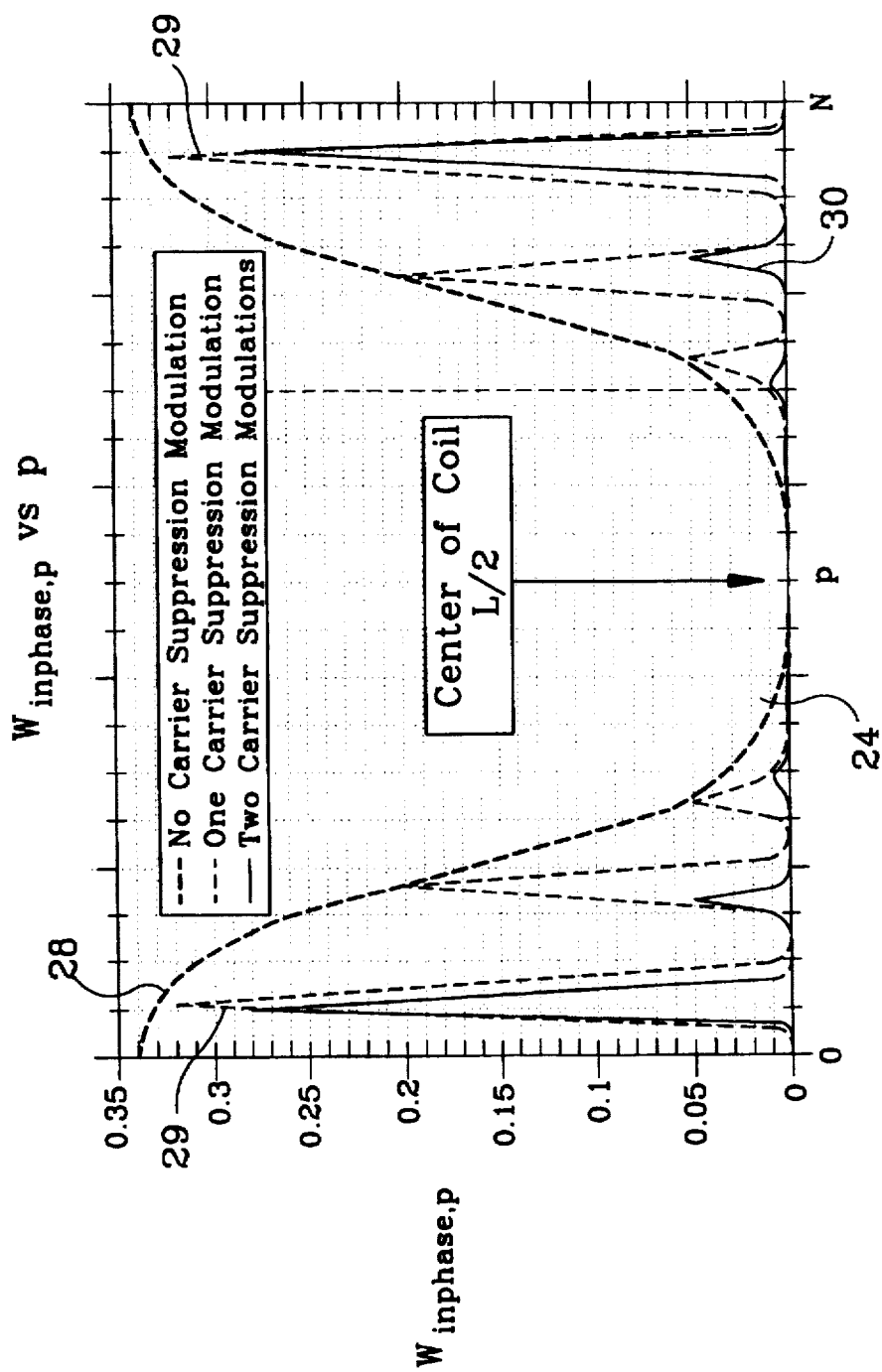
FIG. 4 shows a plot of backscatter error for the situations where no carrier suppression modulation is applied, one carrier suppression modulation frequency is eight times the proper frequency, and two carrier suppression modulations have frequencies at eight and ten times the proper frequency, respectively.

For the cases where the carrier suppression frequency is near even multiple integers of the proper frequency, the summation of Equation 35 is very difficult to simplify, therefore the error reduction for these cases is found numerically. The plot in FIG. 4 shows numerical calculations of the function $W_{inphase,p}$ vs. p for three cases: plot 28 for no carrier suppression modulation employed; plot 29 for one carrier suppression modulation employed at 8 times the proper frequency; and plot 30 for two carrier suppression modulations employed at 8 and 10 times the proper frequency. The bias modulation amplitude $2\Phi_m$ was assumed to be 1.8 radians and the suppression modulation amplitude $2\Phi_s$ was assumed to be 2.4 radians. The areas under curves 28, 29 and 30 are proportional to the backscatter error. The degree of relative error reduction is found by normalizing the areas under curves 29 and 30 to the area corresponding to no carrier suppression. Employment of one or two carrier suppression modulations having an amplitude of 2.4 radians will reduce the backscatter error by about a factor of 3 or 8, respectively.

Figure 5:
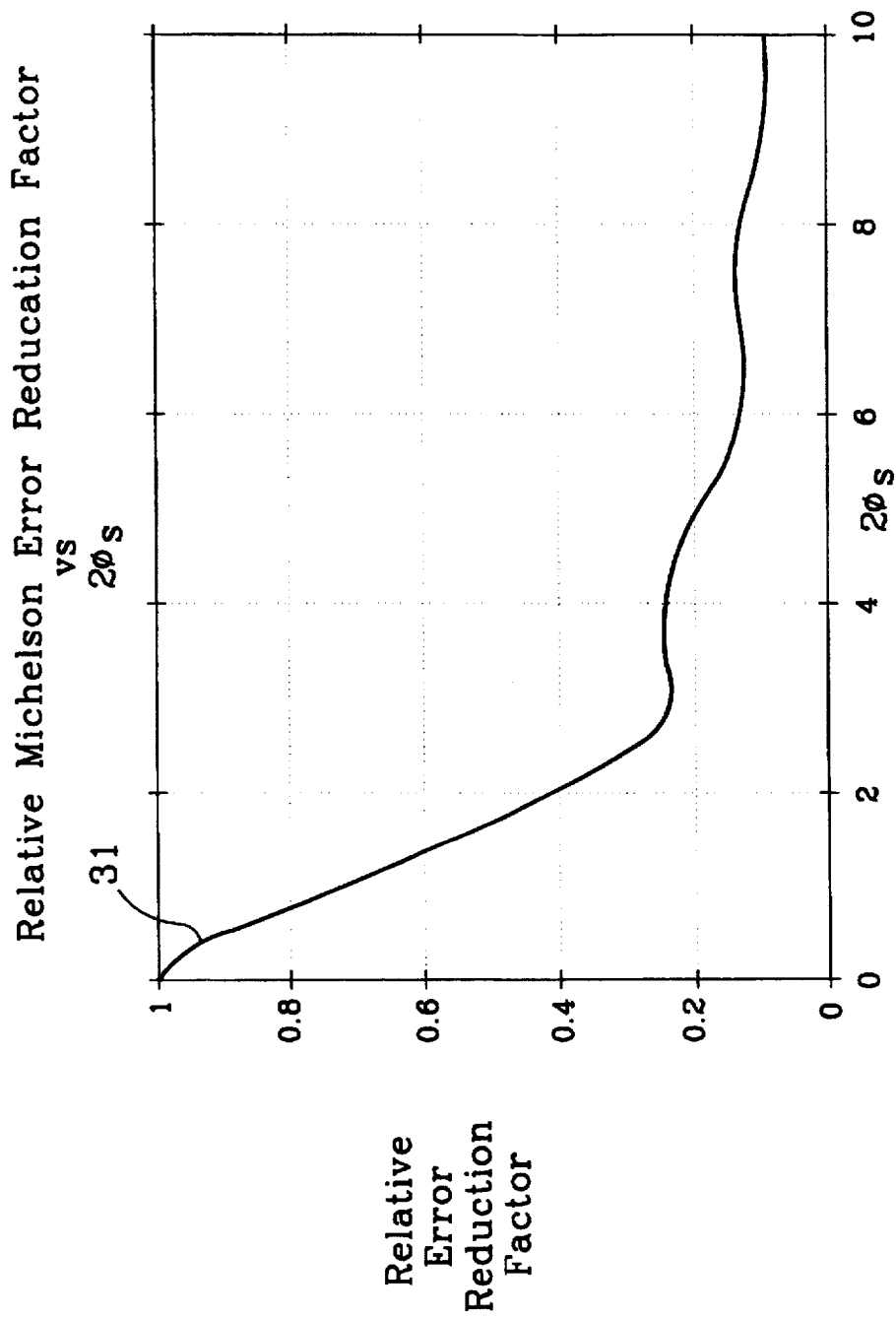
FIG. 5 is a plot of backscatter error reduction versus suppression modulation depth.

To determine the error reduction as a function of carrier suppression amplitude, normalized areas are numerically calculated for various modulation amplitudes. The results of these calculations are shown in FIG. 5. FIG. 5 is a plot 31 of calculated backscatter error reduction vs. suppression modulation depth. Carrier suppression modulation frequency was assumed to be 8 times the proper frequency. Solid curve 31 shows that the backscatter error can not be reduced to near zero at a modulation amplitude of 2.4 radians. To obtain an error reduction factor of 3 or more, either a larger modulation depth must be used or two modulations must be employed.

Figure 6:
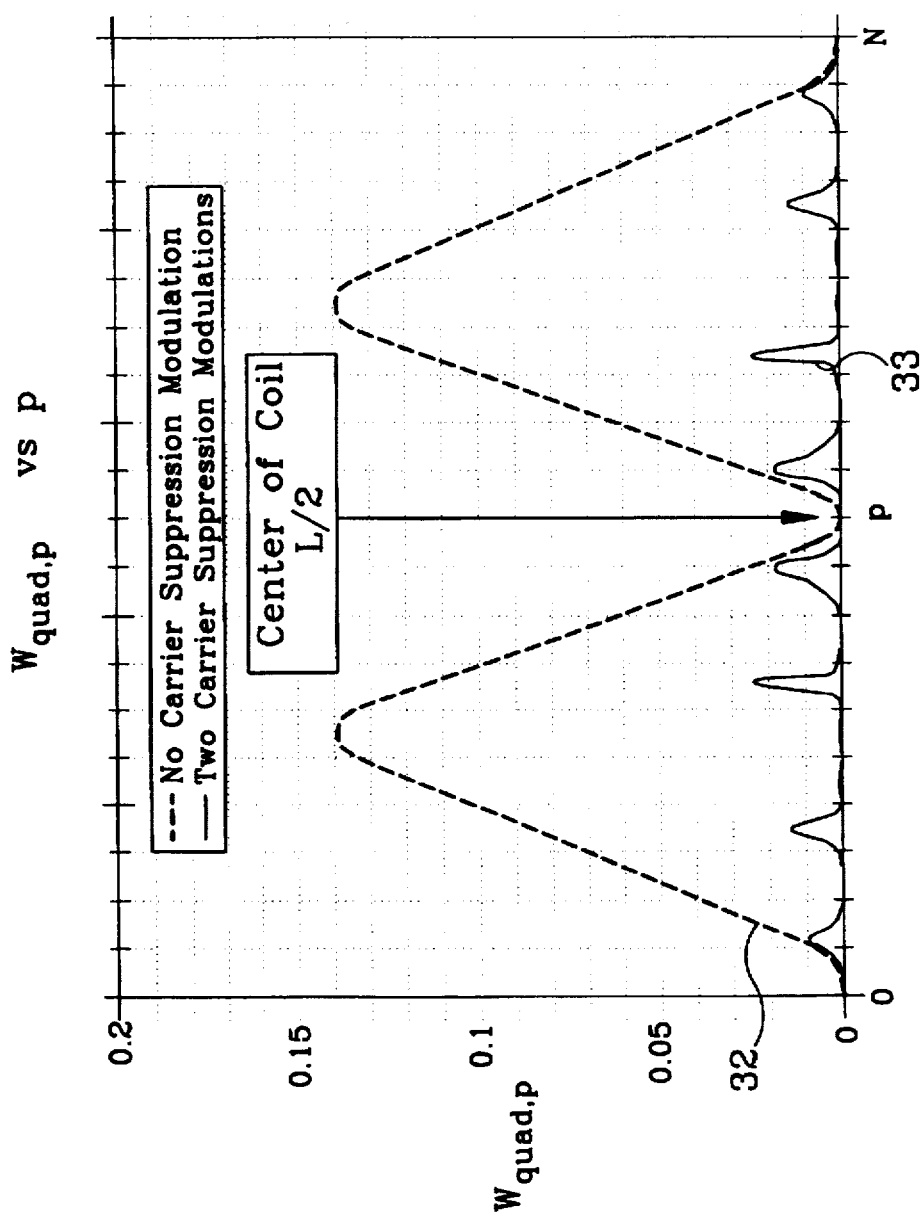
FIG. 6 shows plots of relative quadrature versus position for no suppression modulation and for two suppression modulation and for two suppression modulations.

FIG. 6 shows calculations of the quadrature backscatter error vs. position in the loop for two cases: a curve 32 for no carrier suppression modulation and a curve 33 for two carrier suppression modulations operating at 8 and 10 times the proper frequency. This plot shows that the quadrature error is less in magnitude than the in-phase error. Since this error is in quadrature, it is mostly rejected by the phase sensitive detector (PSD) that demodulates the rate signal, and is therefore insignificant compared to the in-phase error. The plot also shows that the same suppression modulation used to reduce the in-phase error will also reduce the quadrature error. Since the quadrature error appears to be insignificant, it will no longer be considered in this analysis.

A side effect of carrier suppression modulation an AC rate output error. Since the carrier suppression modulation produces a sinusoidal non-reciprocal phase modulation between the two main waves in the loop, it will generate an unwanted sinusoidal rate signal (AC rate). The frequency of the most significant AC rate signal, generated by a suppression modulation operating well below the proper frequency, will be mainly at the suppression modulation frequency. For a carrier suppression modulation operating near multiple integers of twice the proper frequency, the frequency of the AC rate is not obvious. The amplitude of the AC rate corresponding to suppression modulation operating at low frequency will be calculated first.

The electric fields of the main waves or primary waves at the input/output port of IOC 21 are:

$$\vec{E}_1 = \alpha E_0 e^{j(\omega t + \Phi_m \sin(\omega_m t) + \Phi_s \sin(\omega_s t - \omega_s \tau/2))} \quad (40)$$

$$\vec{E}_2 = \alpha E_0 e^{j(\omega t + \Phi_m \sin(\omega_m t - \omega_m \tau) + \Phi_s \sin(\omega_s t - \Phi_s \tau/2))} \quad (41)$$

For this case the carrier suppression frequency is assumed to be much less than the bias modulation frequency $$\omega_s << \omega_m, \quad (42)$$

and therefore the following approximations are made:

$$J_0\left[2\phi_s \sin\left(\frac{\omega_s \tau}{2}\right)\right] \approx 1 \quad (43)$$

$$I_{sig} = 4\alpha^2 E_0^2 J_1(2\phi_m)\phi_R \quad (44)$$

$$I_{sig} = 4\alpha^2 E_0^2 J_1(2\Phi_m)\Phi_R \quad (44)$$

For a zero rotation rate ($\Phi_R = 0$) the intensity of the interfering main waves is $$I_{main} = 2\alpha^2 I_0 \{1 + \cos[2\Phi_m \sin(\omega_m t) - 2\Phi_s \sin(\omega_s \tau/2) \cos(\omega_s t - \omega_s \tau/2)]\}. \quad (45)$$

Using Eq. 42, one can make more approximations:

$$\sin\left(\frac{\omega_s \tau}{2}\right) \approx \frac{\omega_s \tau}{2} \quad (46)$$

$$J_1\left(\frac{\omega_s}{\omega_m} \phi_s \pi\right) \approx \frac{\omega_s}{\omega_m} \frac{R\phi_s \pi}{2}. \quad (47)$$

The cosine function in Equation 45 can be written as $$\cos\left[2\phi_m\sin(\omega_m t) - 2\phi_s\sin\left(\frac{\omega_s\tau}{2}\right)\cos\left(\omega_s t - \frac{\omega_s\tau}{2}\right)\right] = \quad (48)$$

$$\cos|2\phi_m\sin(\omega_m t)|\cos\left[\frac{\omega_s}{\omega_m}\phi_s\pi\cos(\omega_s t)\right] +$$

$$\sin|2\phi_m\sin(\omega_m t)|\sin\left[\frac{\omega_s}{\omega_m}\phi_s\pi\cos(\omega_s t)\right].$$

The second term on the right-hand side (RHS) of Equation 48 can be written as a series of Bessel functions $$\sin|2\phi_m\sin(\omega_m t)|\sin\left[\frac{\omega_s}{\omega_m}\phi_s\pi\cos(\omega_s t)\right] = \quad (49)$$

$$4J_1\left(\frac{\omega_s}{\omega_m}\phi_s\pi\right)J_1(2\phi_m)\sin(\omega_s t)\sin(\omega_m t) -$$

$$4J_3\left(\frac{\omega_s}{\omega_m}\phi_s\pi\right)J_1(2\phi_m)\sin(3\omega_s t)\sin(\omega_m t) +$$

$$4J_5\left(\frac{\omega_s}{\omega_m}\phi_s\pi\right)J_1(2\phi_m)\sin(5\omega_s t)\sin(\omega_m t)$$

$$\vdots$$

Equation 49 shows that many AC rate signals are generated at odd multiple integers of the suppression modulation frequency. Since the amplitude of the AC rate signals diminishes for the higher frequencies, the most significant unwanted signal (represented by the first term on the RHS of Equation 49) occurs at the suppression modulation frequency. Using the first term on the RHS of Equation 49 and Equations 45 and 48, the AC intensity signal is found to be $$I_{main,ac} = 4\alpha^2 I_0 \frac{\omega_s}{\omega_m} \phi_s\pi J_1(2\phi_m)\sin(\omega_s t). \quad (50)$$

Combining Equation 50 with Equations 26 and 44 the AC rate signal is found to be $$\Omega_{ac} = \frac{\omega_s}{\omega_m} \frac{\phi_s\lambda c}{2LD}. \quad (51)$$

For a typical navigation grade IFOG operating at a source wavelength of 0.83 μm, and a carrier suppression modulation frequency of 10 Hz, the AC rate at 10 Hz is about $$\Omega_{ac} = \frac{10^{-4} \times 2.4 \times 0.83 \times 10^{-6}\,\text{m} \times 3 \times 10^8\,\text{m} \cdot s^{-1}}{2 \times 1000\,\text{m} \times 0.0635\,\text{m}} \frac{180\,\text{deg}}{\pi} \frac{3600\,s}{\text{hr}} \approx 97\,\text{deg/hr}. \quad (52)$$

To determine the significance of the AC rate, it must be compared to the normal random bias fluctuation $\Omega_{ran}$ of the gyro output at an integration time equal to about one-half the period of the AC rate. The random bias fluctuation (at an integration time of $1.4\times10^{-5}$ hr) of a typical navigation grade IFOG operating at a source wavelength of 0.83 μm is $$\Omega_{ran} = ARW\sqrt{\frac{2}{T}} = \quad (53)$$

$$0.001\,\text{deg}/\sqrt{\text{hr}}\sqrt{\frac{2}{1.4\times10^{-5}\,\text{hr}}} = 0.38\,\text{deg/hr}.$$

For a high performance grade IFOG operating at a source wavelength of 1.55 μm, and a carrier suppression modulation frequency of 10 Hz, the AC rate at 10 Hz is about $$\Omega_{ac} = \frac{4\times10^{-4}\times2.4\times1.55\times10^{-6}\,\text{m}\times3\times10^8\,\text{m}\cdot s^{-1}}{2\times4000\,\text{m}\times0.15\,\text{m}} \frac{180\,\text{deg}}{\pi} \frac{3600\,s}{\text{hr}} \approx 77\,\text{deg/hr}. \quad (54)$$

The random bias fluctuation (at an integration time of $2.8\times10^{-5}$ hr) of a high performance IFOG operating at a source wavelength of 1.55 μm is $$\Omega_{ran} = ARW\sqrt{\frac{2}{T}} = \quad (55)$$

$$0.0001\,\text{deg}/\sqrt{\text{hr}}\sqrt{\frac{2}{1.4\times10^{-5}\,\text{hr}}} = 0.038\,\text{deg/hr}.$$

A comparison of the AC rate amplitude and the random bias fluctuations shows that the employment of low frequency carrier suppression modulation will cause the gyro to be out of bias specification at integration times of approximately one-half the AC rate period. Since the AC rate is induced by an applied phase modulation, it could be partially removed from the gyro output. However, the amplitude of the AC rate will depend on the optical and electrical gains of the system, and therefore will not be constant over time. To reduce the AC rate below the level of normal bias fluctuations would be an aggressive task. Furthermore for a closed loop system, the main feedback loop will cancel out an externally applied phase modulation. Therefore the carrier suppression modulation must be produced by "forcing" the main feedback loop to generate the phase modulation. This would greatly increase the complexity of the main feedback loop electronics.

It would be preferable to employ carrier suppression modulation in a manner that does not influence the main feedback loop and does not generate a significant AC rate. By operating the suppression modulation near multiple integers of twice the proper frequency, the preferable mode of operation can be realized. To determine the optimum mode of operation for the suppression modulation, the AC rate amplitude is calculated for a relatively high suppression modulation frequency. The suppression modulation frequency can be written as $$\omega_s = k\omega_m + \omega_e, k=2,4,6 \quad (56)$$

where $\omega_e$ represent the small deviation from the even multiple integer of the proper frequency (which is also the bias modulation frequency in this analysis). By assuming $\omega_e$ is relatively small, the following approximations can be made $$\sin\left(\frac{\omega_s \tau}{2}\right) = (-1)^k \sin\left(\frac{\omega_s \tau}{2}\right) \approx (-1)^k \frac{\omega_s \tau}{2} \qquad (57)$$

$$\cos\left(\omega_s t - \frac{\omega_s \tau}{2}\right) = (-1)^k \cos[(k\omega_m + \omega_s)t] \qquad (58)$$

The intensity due to the interference of the main waves is $$I_{main} = 2\alpha^2 I_0 \{1 + \cos |2\Phi_m \sin (\omega_m t)| \cos |\Phi_s \omega_c \tau \cos ((k\omega_m + \omega_c)t)| + \sin |2\Phi_m \sin (\omega_m t)| \sin |\Phi_s \omega_c \tau \cos ((k\omega_m + \omega_c)t)|\}. \qquad (59)$$

second term on the RHS of Equation 59 can be written as $$\sin |2\Phi_m \sin (\omega_m t)| \sin |\Phi_s \omega_c \tau \cos ((k\omega_m + \omega_c)t)| = 2\Phi_s \omega_c \tau J_q(2\Phi_m) \\ \sin (q \, \omega_m t) \sin |(k_{107\,m} + \omega_c)t| + \text{other terms} \qquad (60)$$

where q refers to the order of a particular term in the series of Bessel functions representing the left-hand side (LHS) of Equation 60. The product of the sine functions in the first term on the RHS of equation 59 can be written as $$\sin(q\omega_m t)\sin[(k\omega_m + \omega_c)t] = \frac{1}{2} \{\cos(\omega_c t)\cos[(k-q)\omega_m t] - \\ \sin(\omega_c t)\sin[(k-q)\omega_m t] - \\ \cos(\omega_c t)\cos[(k+q)\omega_m t] + \\ \sin(\omega_c t)\sin[(k+q)\omega_m t]\} \qquad (61)$$

The second term on the RHS of Equation 61 represents an amplitude modulated signal that is synchronous with the bias modulation and has an envelope that occurs at the frequency $\omega_c$ when $k-q = \pm 1$. The term producing the largest AC rate corresponds to the following condition $$q = k - 1. \qquad (62)$$

The amplitude-modulated signal is demodulated by the gyro electronics producing an unwanted AC output with an amplitude that is proportional to $$I_{main,ac} = 2\alpha^2 I_0 \Phi_s \tau J_q(2\Phi_m). \qquad (63)$$

Using Equation 62 and 63 the AC rate is found to be $$\Omega_{ac} = \frac{\omega_s}{\omega_m} \frac{\phi_s \lambda c}{4LD} \frac{J_{k-1}(2\phi_m)}{J_1(2\phi_m)}. \qquad (64)$$

The AC rate for the case of carrier suppression at high frequency is similar to the case of carrier suppression at low frequency except a factor of ½ and the ratio $J_{k-1}(2\Phi_m)/J_1(2\Phi_m)$ which can significantly reduce the AC rate.

Figure 7:
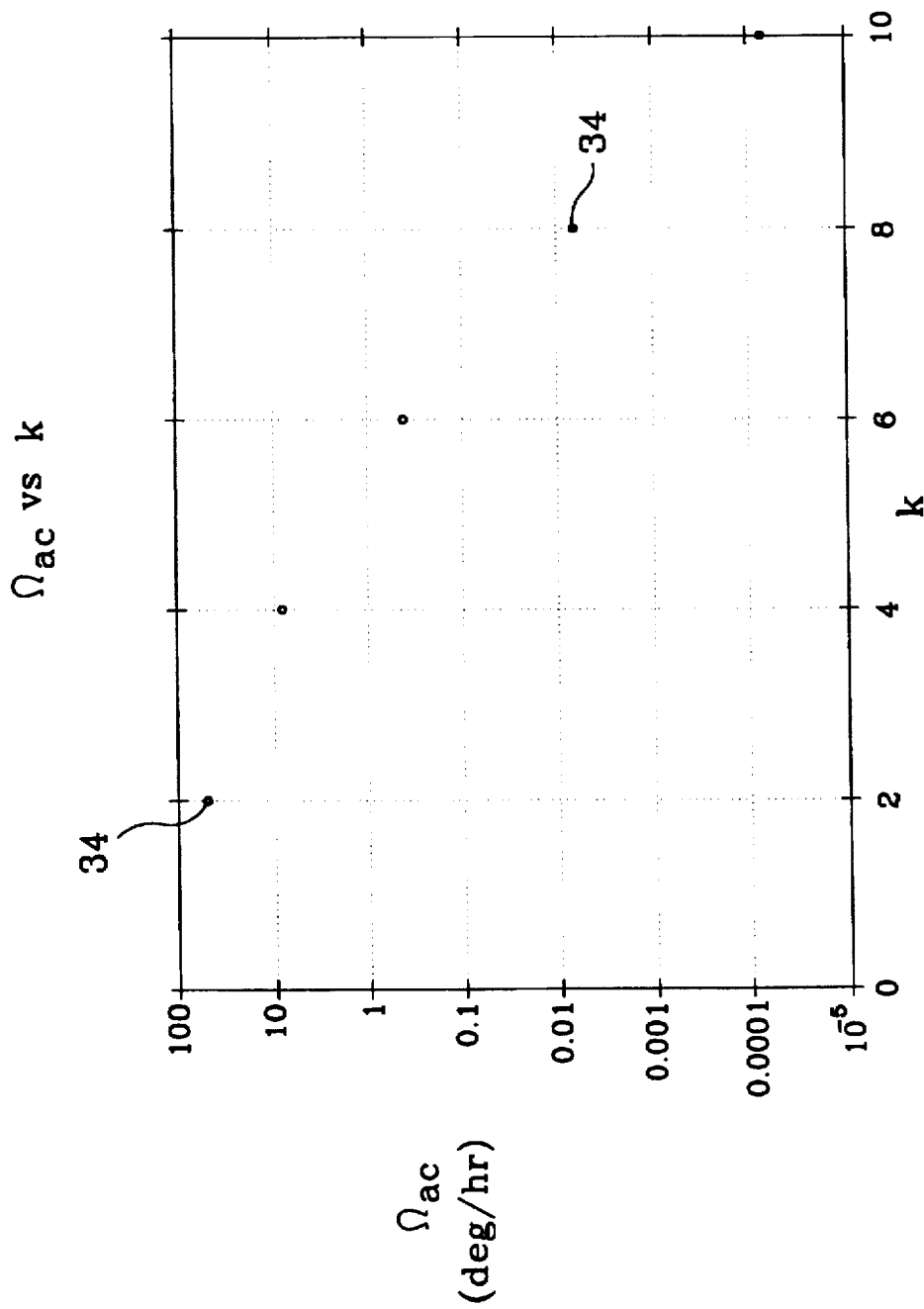
FIG. 7 is a plot of the unwanted sinusoidal rate signal of a gyroscope using carrier suppression at frequencies 10 Hz off of even multiples of the proper frequency.

FIG. 7 shows a plot 34 of calculated AC rate for a high performance IFOG employing carrier suppression at frequencies 10 Hz off even multiples of the proper frequency and at an amplitude of 2.4 radians. The index k refers to an even harmonic of the proper frequency. Plot 34 shows that the preferred operating frequency for the suppression modulation is near 8 times the proper frequency or greater. At these frequencies, the unwanted AC rate signal is reduce to levels below the normal bias fluctuations of the gyro output. Furthermore, by employing the carrier suppression modulation frequencies well above the bandwidth of the main feedback loop, the main loop is unaffected by the suppression modulation.

Figure 8:
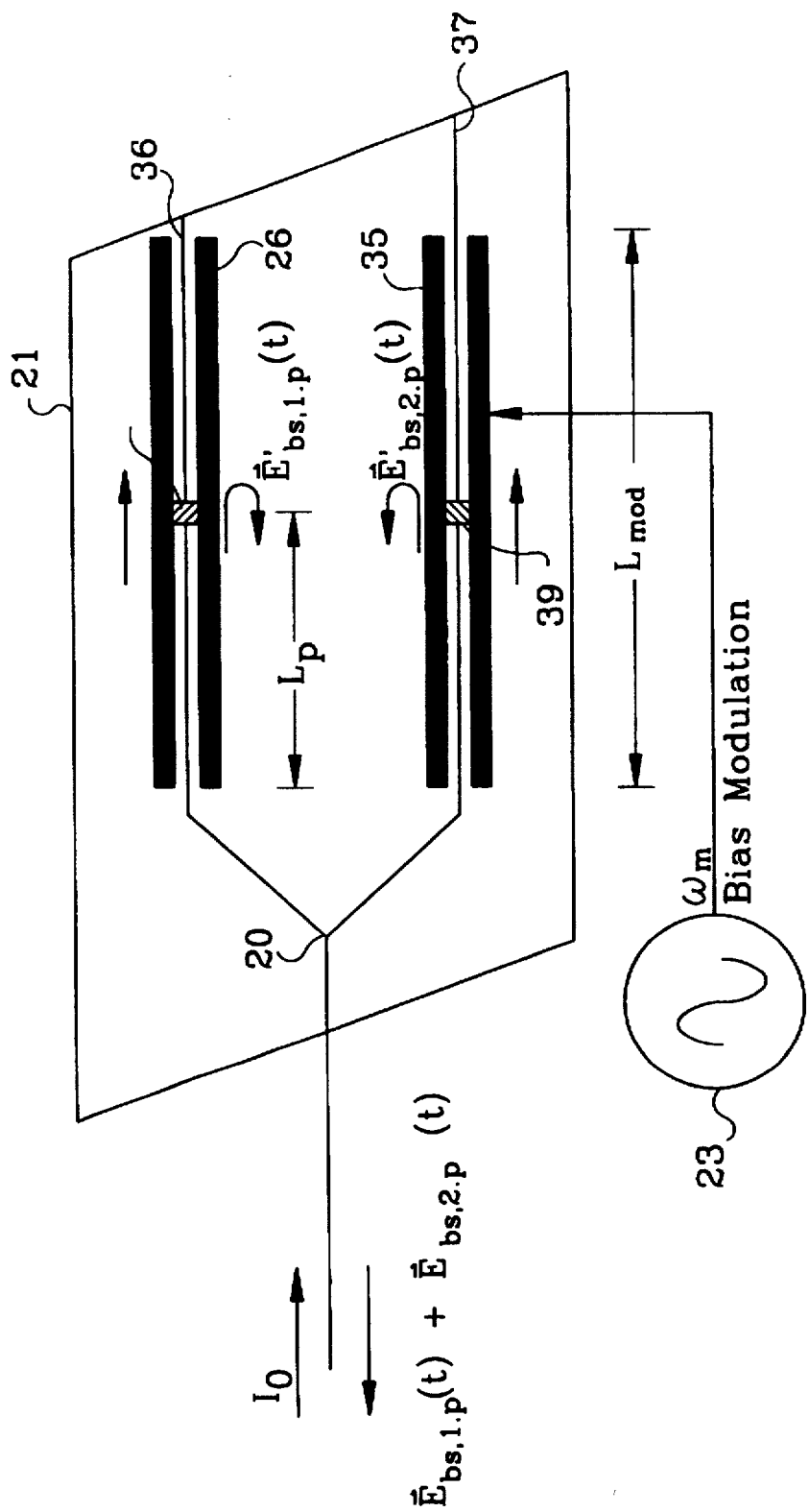
FIG. 8 shows the Rayleigh backscatter wave paths in an integrated optics circuit.

Rayleigh backscatter will also occur from IOC 21 waveguides 36 and 37. Such backscatter contributes to rotation sensing error. Even though IOC 21 waveguides 36 and 37 are very short compared to the fiber in sensing coil 12, the optical loss per unit length of the chip 21 waveguide is about 4 orders of magnitude greater than the loss per unit length of the fiber of coil 12. Therefore, it is possible that the rotation error associated with backscatter within IOC 21 waveguides 36 and 37 is significant. FIG. 8 shows a diagram of integrated optics chip 21 and how the backscatter is modulated by bias modulation generator 23 and modulator 35.

The backscatter wave traveling through bias modulator 35 is phase modulated with an amplitude $\Phi_m(x_p)$ that depends on the distance $L_{mod}$ traveled through the modulator 35. The electric fields of the scattered waves are:

$$E'_{bs,1,p}(t) = \alpha^{1/2} E_{bs} e^{i\psi_{1,p}(t)} \qquad (65)$$

$$E'_{bs,2,p}(t) = \alpha^{1/2} E_{bs} e^{i\{\Phi_m(x_p) \sin (\omega_m t) + \psi_{2,p}(t)\}}. \qquad (66)$$

The phase difference is defined as $$\Delta\psi_p(t) = \psi_{1,p}(t) - \psi_{2,p}(t). \qquad (67)$$

The backscatter intensity is $$I_{bs,p}(t) = 2\alpha I_{bs}\{1 + \cos |\Phi_m(x_p) \sin (\omega_m t) + \Delta\psi_p(t)|\}. \qquad (68)$$

The cosine function on the RHS of Equation 68 can be written as $$\cos |\Phi_m(x_p) \sin (\omega_m t) + \Delta\psi_p(t)| = \cos |\Delta\psi_p(t)| \cos |\Phi_m(x_p) \sin (\omega_m t)| \\ - \sin |\Delta\psi_p(t)| \sin |\Phi_m(x_p) \sin (\omega_m t)|. \qquad (69)$$

The second term on the RHS of Equation 69 can be written as $$\sin |\Delta\psi_p(t)| \sin |\Phi_m(x_p) \sin (\omega_m t)| = 2 \sin |\Delta\psi_p(t)| J_1 |\Phi_m(x_p)| \sin (\omega_m t) + \text{other terms} \qquad (70)$$

Therefore the peak amplitude of the error signal due to backscatter from a pair of IOC 21 waveguide sections 36 and 37 is $$I_{bs,sig,p} = 4 I_{bs} J_1 |\Phi_m(x_p)|. \qquad (71)$$

The net error signal $I_{err,sig}$ is the root-sum-square of the peak amplitudes corresponding to all backscattering pairs of IOC 21 waveguide sections 36 and 37. The net signal is $$I_{err,sig} = \sqrt{\sum_{p=1}^{N} I_{bs,sig,p}^2} \qquad (72)$$

where the number of pairs of waveguide sections is $$N = \frac{L_m}{L_c} \qquad (73)$$

and $L_m$ is the length of the phase modulator 35. The amplitude of the backscatter phase modulation is assumed to be a linear function with $x_p$ $$\phi_m(x_p) = \frac{2\phi_{m,max}}{L_m} x_p. \qquad (74)$$

where $\Phi_{m,max}$ is the amplitude of phase modulation for an optical wave making one full pass through phase modulator 35. The distance $x_p$ can be expressed as the number of coherence lengths that fit within the distance $L_p$ between the beginning of phase modulator 35 and scattering section 39, $$x_p = L_c p. \qquad (75)$$

The net error signal due to backscatter in IOC 21 waveguides 36 and 37 can be written as $$I_{err,sig} = 4\alpha I_{bs} \sqrt{\sum_{p=1}^{N} \left( J_1\left(\frac{2\phi_{m,max}}{N} p\right) \right)^2} \quad (76)$$

A plot of the function $$\left( J_1\left(\frac{2\phi_{m,max}}{N} p\right) \right)^2$$

Figure 9:
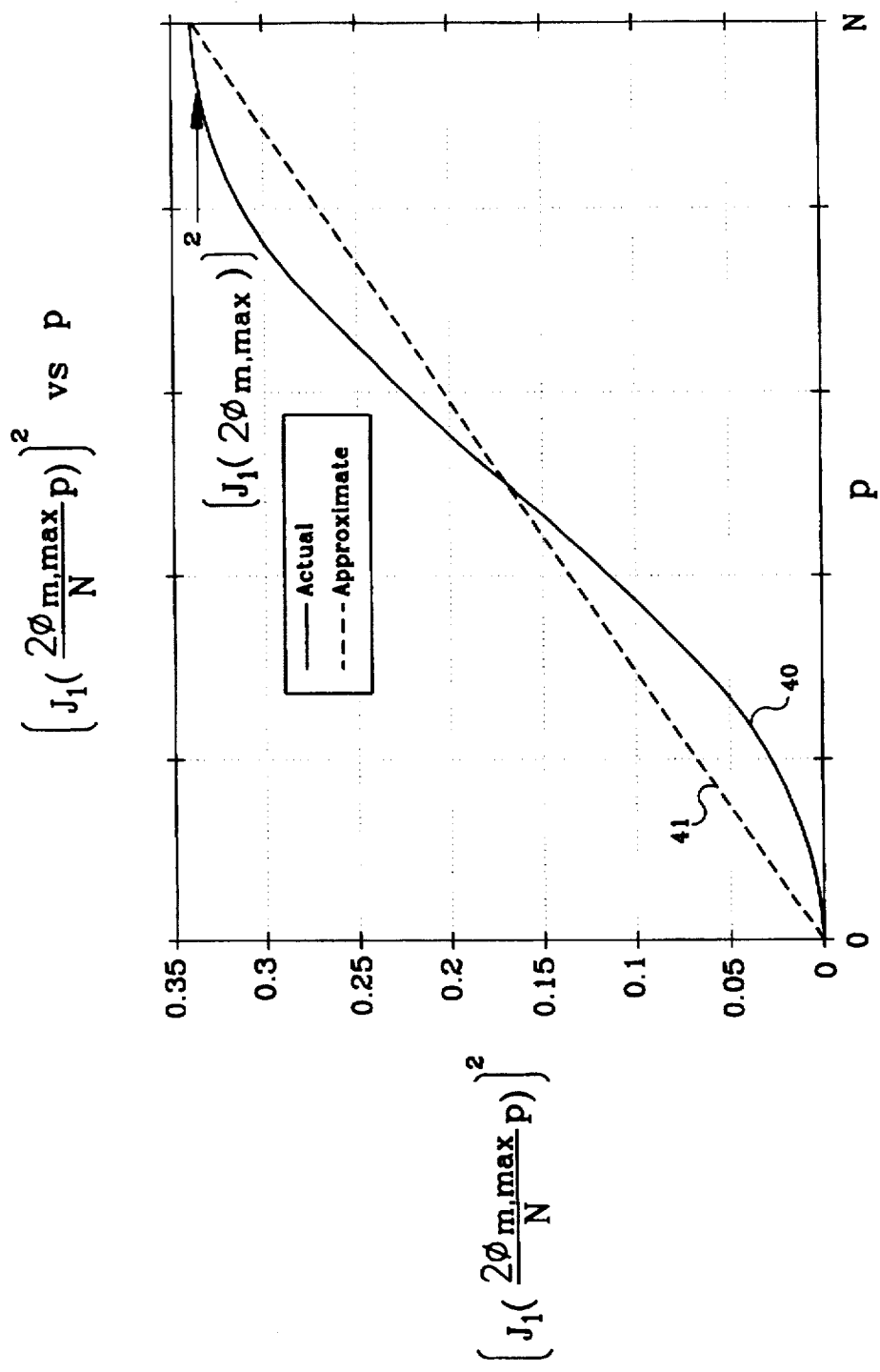
FIG. 9 plots the net error signal due to backscatter in the waveguides of the integrated optic circuit.

(see FIG. 9) shows that the area under curve 40 can be approximated by the area under a linear function or fit curve 41.

The approximation to the summation in Equation 76 is $$\sum_{p=1}^{N} J_1^2\left(\frac{2\phi_{m,max}}{N} p\right) = \frac{J_1^2(2\phi_{m,max})}{N} \sum_{p=1}^{N} p \quad (77)$$

and $$\sum_{p=1}^{N} p = \frac{1}{2}(N^2 + N) \approx \frac{1}{2} N^2. \quad (78)$$

$$\Omega_{err,chip} = \frac{0.83 \times 10^{-6} m \times 3 \times 10^8 m \cdot s^{-1} \times 4.8 \times 10^{-3} m^{-1}}{2\sqrt{2} \; \pi \times 1000 m \times 0.0635 m} \sqrt{2 \times 10^{-5} m \times 0.02 m} \; \frac{180 \deg}{\pi} \; \frac{3600 s}{hr} \quad (85)$$

$$\Omega_{err,chip} = 0.3 \; \text{deg/hr}.$$

The net error signal is then $$I_{err,sig} = \alpha 2\sqrt{2N} \; U_1(2\phi_{m,max}) I_{bs} \quad (79)$$

$$I_{err,sig} = \alpha 2\sqrt{2N} \; U_1(2\phi_m) I_{bs}.$$

The backscatter intensity from a section of IOC 21 waveguide 36 or 37 is $$I_{bs} = \alpha \eta_{chip} I_0 L_c \quad (80)$$

where $\eta_{chip}$ is the fractional captured backscatter intensity per unit length. The net error signal can be written as $$I_{err,sig} = 2\sqrt{2} \; \alpha^2 \eta_{chip} I_0 U_1(2\phi_{m,max}) \sqrt{L_c L_m}. \quad (81)$$

The rotation rate that will produce a signal that is equivalent to the backscatter error signal is $$\Omega_{err,chip} = \frac{\lambda c \eta_{chip}}{2\sqrt{2} \; \pi L D} \sqrt{L_c L_m}. \quad (82)$$

The value of backscatter per unit length of the fiber of coil 12 was obtained from experimental measurements made with a 1.55 μm Er-doped fiber light source 14. To estimate $\eta_{chip}$, the capture factor associated with fiber 12 is assumed to be the same for IOC 21; and the ratio of loss due to scattering to total loss of fiber 12 is assumed to be the same for IOC 21. With these assumptions the ratio $$\frac{\eta_{chip}}{\eta_{fiber}} = \frac{\text{chiploss}}{\text{fiberloss}} = 6.4 \times 10^3 \quad (83)$$

can be used to estimate $\eta_{chip}$, which is $$\eta_{chip} = 4.8 \times 10^{-3} m^{-1} \quad (84)$$

For a navigation grade IFOG operating at a source 14 wavelength of 0.83 μm, the calculated value for the rotation sensing error due to backscatter in IOC 21 waveguides 36 and 37 is For a high performance IFOG operating at a source 14 wavelength of 1.55 μm, the calculated value for the rotation sensing error due to backscatter in IOC 21 waveguides 36 and 37 is $$\Omega_{err,chip} = \frac{1.55 \times 10^{-6} m \times 3 \times 10^8 m \cdot s^{-1} \times 4 \times 10^{-4} m^{-1}}{2\sqrt{2} \; \pi \times 4000 m \times 0.0635 m} \sqrt{2 \times 10^{-5} m \times 0.02 m} \; \frac{180 \deg}{\pi} \; \frac{3600 s}{hr} \quad (86)$$

$$\Omega_{err,chip} = 0.01 \; \text{deg/hr}.$$

These calculations show that the rotation rate error is much greater for backscatter from the IOC waveguide than for backscatter from the sensing coil fiber. The actual error may not be as large if the captured backscatter per unit length of IOC waveguide has been over estimated. Experimental tests of IFOG bias stability suggests that the observed $\Omega_{err,chip}$ is not as large as the calculated value, but is still significant.

Figure 10:
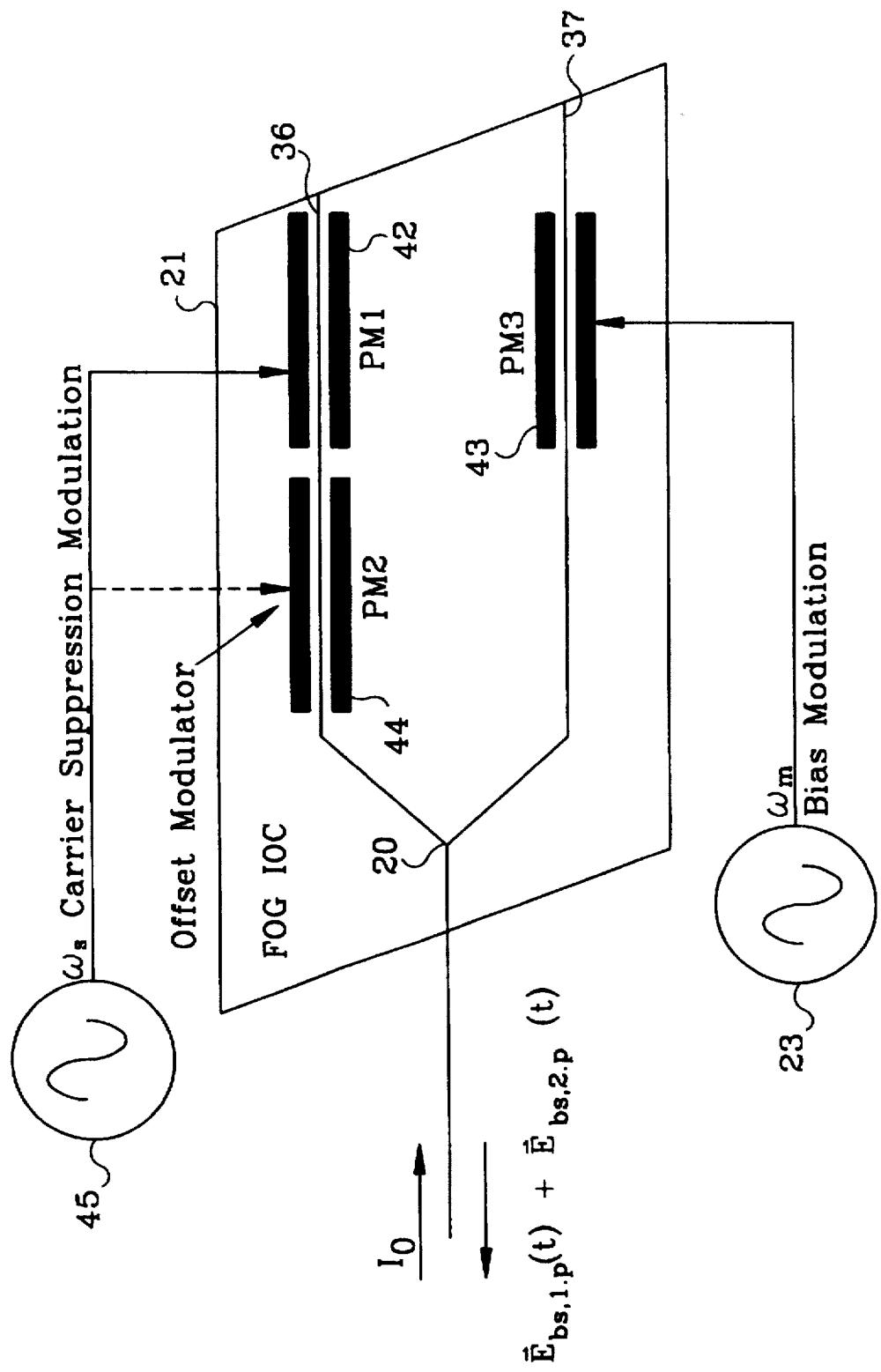
FIG. 10 shows an integrated optic circuit having carrier suppression modulators.

Carrier suppression modulation can also be used to reduce rotation errors associated with backscatter from IOC 21 waveguides 36 and 37. FIG. 10 shows a diagram of an IFOG IOC 21 employing carrier suppression modulation 45. Two configurations are considered: (1) carrier suppression modulation 45 applied to a modulator 42 (PM1) opposite to bias phase modulator 43 (PM3); and (2) carrier suppression modulation 45 applied to an offset modulator 44 (PM2) placed before bias phase modulator 43 in the direction away from junction 20. The first configuration is analyzed below.

The electric fields associated with the scattered waves are:

$$\vec{E}_{bs,1,p}(t) = \alpha^{1/2} E_{bs} e^{i\{\Phi_s(x_p) \sin (\omega_s t) + \psi_{1,p}(t)\}} \quad (87)$$

$$\vec{E}_{bs,2,p}(t) = \alpha^{1/2} E_{bs} e^{i\{\Phi_m(x_p) \sin (\omega_m t) + \psi_{2,p}(t)\}} \quad (88)$$

The backscatter intensity is $$I_{bs,p(t)} = 2\alpha I_{bs}\{1 + \cos [\Phi_m(x_p) \sin (\omega_m t) - \Phi_s(x_p) \sin (\omega_s t) + \Delta\psi_p(t)]\} \quad (89)$$

The cosine function on the RHS of Equation 89 can be written as $\cos|\phi_m(x_p)\sin(\omega_m t) - \phi_s(x_p)\sin(\omega_s t) + \Delta\psi_p(t)| =$  (90)

$\cos|\Delta\psi_p(t)||\cos|\phi_m(x_p)\sin(\omega_m t)||\cos|\phi_s(x_p)\sin(\omega_s t)| +$ $\cos|\Delta\psi_p(t)||\sin|\phi_m(x_p)\sin(\omega_m t)||\sin|\phi_s(x_p)\sin(\omega_s t)| -$ $\sin|\Delta\psi_p(t)||\sin|\phi_m(x_p)\sin(\omega_m t)||\cos|\phi_s(x_p)\sin(\omega_s t)| -$ $\sin|\Delta\psi_p(t)||\cos|\phi_m(x_p)\sin(\omega_m t)||\sin|\phi_s(x_p)\sin(\omega_s t)|.$ The product of the sine and cosine functions in the third term on the RHS of Equation 90 can be written as $\sin |\Phi_m(x_p) \sin (\omega_m t)|\cos |\Phi_s(x_p) \sin (\omega_s t)|= 2J_0|\Phi_s(x_p)|J_1|\Phi_m(x_p)|$
$\sin (\omega_m t)$+other terms.  (91)

The first term on the RHS of Equation 91 represents a signal that is synchronous with the bias modulation 23. The net error signal due to backscatter from all pairs of IOC 21 waveguide (36 and 37) sections is $$I_{err,sig} = 4\alpha J_{bs,rms}\sqrt{\sum_{p=1}^{N}\left(J_0\left(\frac{2\phi_{s,max}}{N} p\right)J_1\left(\frac{2\phi_{m,max}}{N} p\right)\right)^2} \quad (92)$$

where $\phi_{s,max}$, $$\phi_m(x_p) = \frac{2\phi_{s,max}}{L_m} x_p, \quad (93)$$

is the amplitude of carrier suppression phase modulation 45 for an optical wave making one full pass through phase modulator 42.

Figure 11:
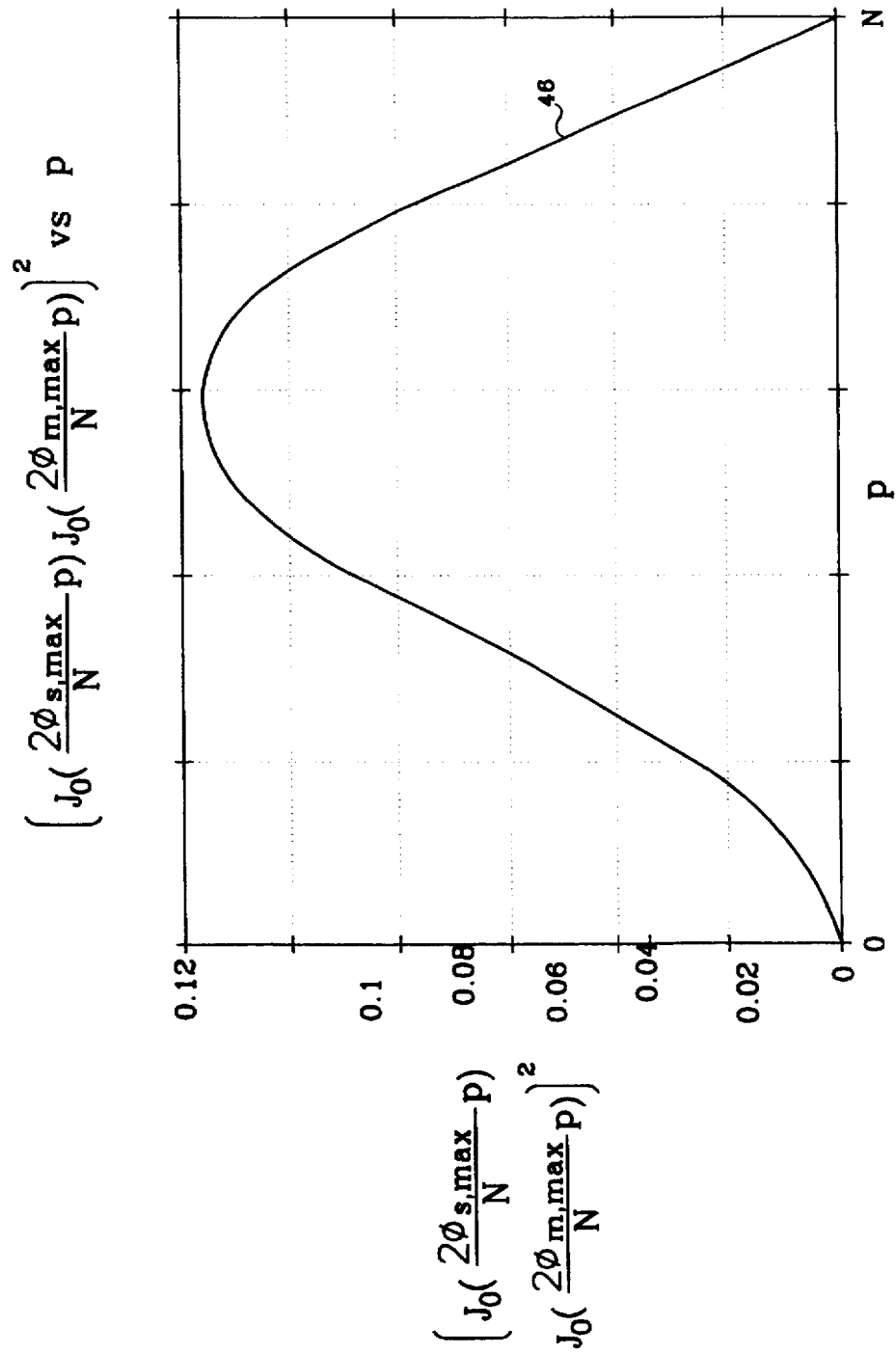
FIG. 11 is a plot that indicates that carrier suppression cannot be achieved simultaneously at all points along the suppression modulator.

A plot 46 of the function $$\left(J_0\left(\frac{2\phi_{s,max}}{N} p\right)J_1\left(\frac{2\phi_{m,max}}{N} p\right)\right)^2$$

vs. p see FIG. 11) shows that carrier suppression can not be achieved simultaneously at all points along modulator 42. Therefore, the backscatter error can not be completely suppressed when the modulation 45 at $\omega_s$ is applied to phase modulator 42 as shown in FIG. 10. For plot 46, $2\Phi_{m,max}$ was set to 1.8 radians and $2\Phi_{s,max}$ was set to 2.4 radians. To calculate the relative error as a function of $2\Phi_{s,max}$, the areas under curves of $$\left(J_0\left(\frac{2\phi_s}{N} p\right)J_1\left(\frac{2\phi_{m,max}}{N} p\right)\right)^2$$

vs. p curve is numerically calculated and then normalized to the area of function associated with no carrier suppression.

Figure 12:
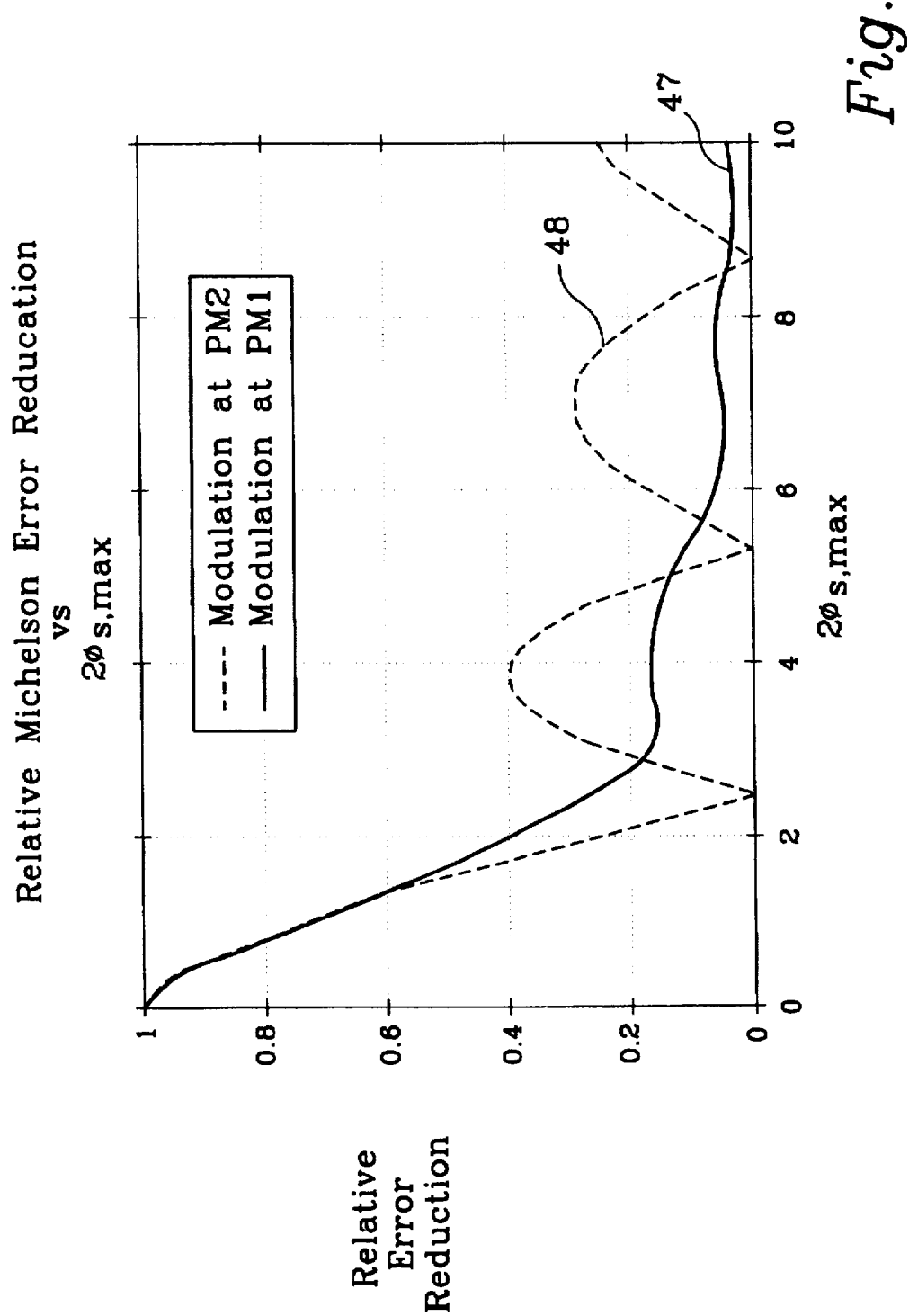
FIG. 12 is a plot of relative backscatter as a function of carrier suppression modulation amplitude.

A plot 47 in FIG. 12 shows that the backscatter error can not be reduced to zero at carrier suppression modulation 45 amplitude of about 2.4 radians when the modulation at $\omega_s$ is applied to phase modulator 42 located opposite to bias modulation 23 on modulator 43. To obtain a greater error reduction, either a larger modulation depth can be used, or two carrier suppression modulations can be employed. Another IOC 21 design enhancement that will allow for greater reductions in backscatter error is a carrier suppression modulator 44 that is placed before the bias phase modulator 43, as shown by plot 48. In this case, the phase modulation amplitude of the scattered waves (that will coherently interfere with the scattered waves from the bias phase modulator 43) is constant for all scattering sections; and therefore carrier suppression can be achieved for all points along phase modulator 44. For this case the electric field of the scatter wave from waveguide 36 having carrier suppression modulator 44 is $E'_{bs,1,p}(t)=\alpha^{1/2}E_{bs}e^{i\{\Phi_{s,max}\sin(\omega_s t)+\psi_{1,p}(t)\}}.$  (94)

The rotation rate error is then $$\Omega_{err,chip} = UoJ(2\phi_{s,max})J\frac{\lambda c\eta_{chip}}{2\sqrt{2} \pi L D} \sqrt{L_c L_m} \quad (95)$$

which can be eliminated when the modulation amplitude $2\Phi_{s,max}$ is set to about 2.4 radians.

An optical design change of the IFOG can also significantly reduce the error associated with backscatter in IOC 21. This change involves replacing the IOC Y-junction 20 with a fiber coupler, and placing IOC 21 phase modulators 42 and 44 such that the backscatter from IOC 21 waveguide 36 will only coherently interfere with backscattered light from fiber on the opposite side of the sensing loop 12. Since the backscattered light from a short section of fiber 12 is significantly less than the backscatter from IOC 21 waveguide 36, the amplitude of the interference between these two waves will be significantly smaller than the amplitude of the interference between two waves that are both backscattered in IOC 21 waveguide 36.

Figure 13:
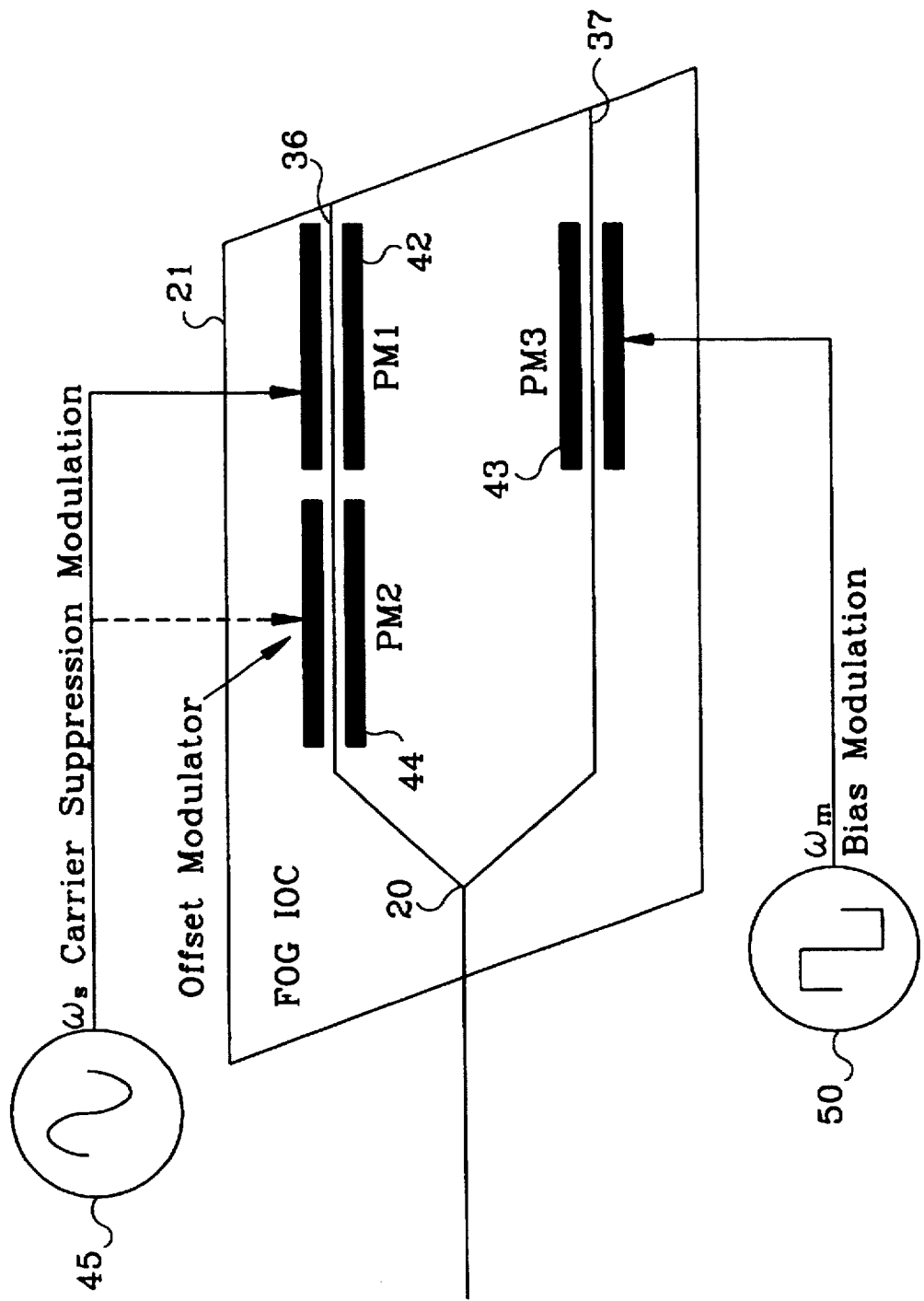
FIG. 13 is a configuration of an integrated optics circuit and modulators involving square wave bias modulation.

The above description and analysis deals with a source of rotation sensing error due to Rayleigh backscatter in an IFOG optical circuit, and also showed a method of reducing or eliminating the backscatter error. This method is referred to as carrier suppression modulation, which involves applying one or more sinusoidal phase modulations to the light propagating through the integrated optics chip 21 of the IFOG. This technique is based on an IFOG sensor employing sinusoidal bias modulation. A high performance IFOG will most likely employ a square-wave bias modulation 50 of FIG. 13, an analog-to-digital converter (ADC) to sample the photodetector signal, and square-wave demodulation. The design approach for the carrier suppression modulation technique is different for an IFOG employing this type of signal processing.

Figure 14:
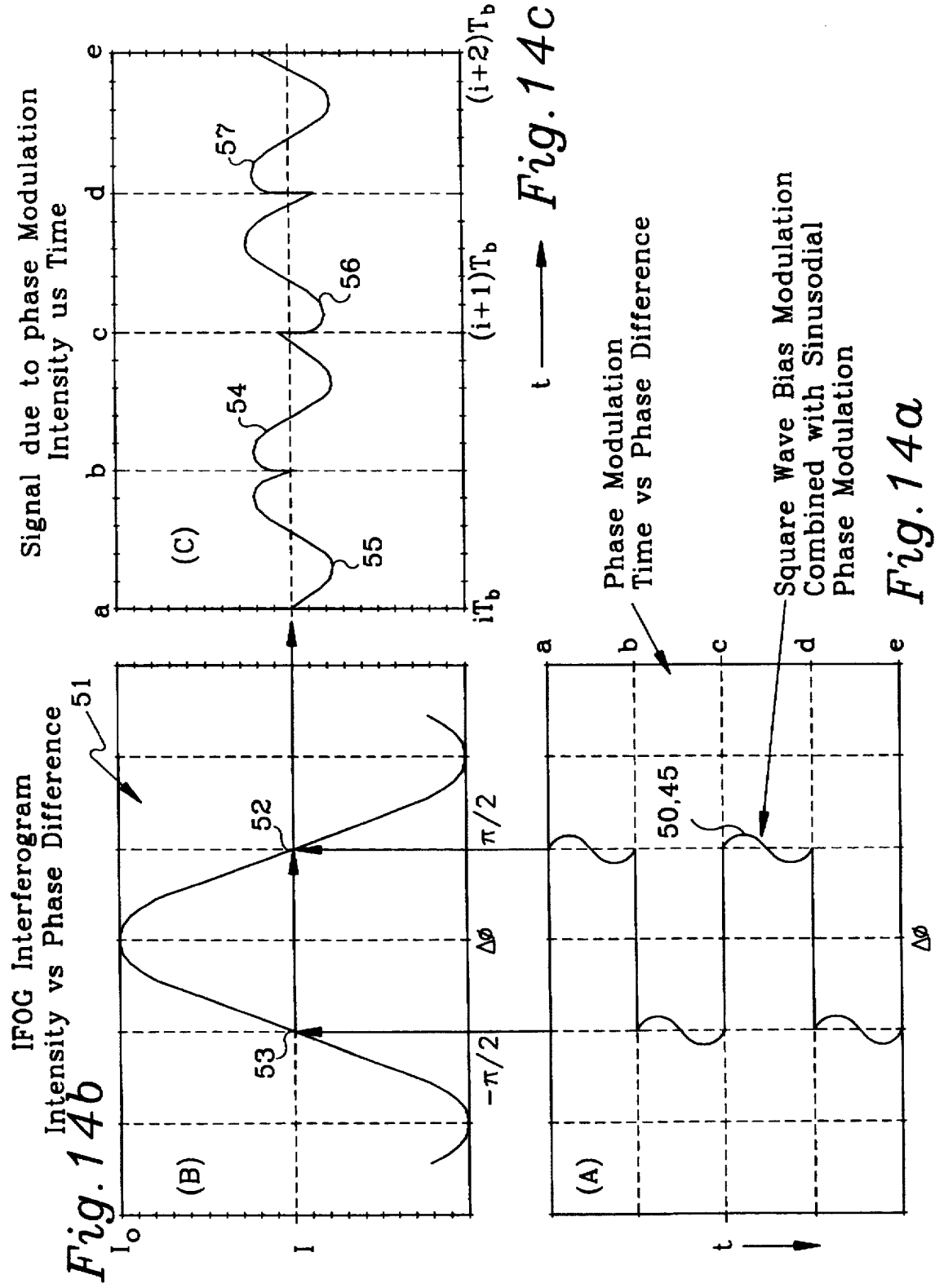
FIGS. 14a, 14b and 14c reveal the interaction of the carrier suppression phase modulation signal with the bias phase modulation signal.

FIGS. 14a, 14b and 14c show how the carrier suppression phase modulation 45 interacts with the bias phase modulation 50 while being converted into a optical intensity signal (intensity modulation) by the sagnac interferometer. The IFOG interferogram (FIG. 14b) shows how the intensity I (detected at the photodetector) varies with the phase difference ΔΦ between the counter-propagating light waves emanating from the Sagnac interferometer. The total phase modulation (FIG. 14a) is assumed to consist of: (i) an ideal square-wave bias modulation 50 with an amplitude of π/2 and at a frequency $f_b$, and (ii) a sinusoidal phase modulation 45 at a frequency of $2f_b+\Delta f$, which is near the second harmonic of the bias modulation 50 frequency. (The amplitude of the sinusoidal phase modulation 45 is exaggerated to illustrate its effects.) When the square-wave bias modulation 50 is at +π/2, the sinusoidal phase modulation shown between points a and b of FIG. 14a is biased at a linear part of interferogram 51, therefore produces the sinusoidal optical intensity signal shown between points a and b of FIG. 14c. When square-wave bias modulation 50 switches state to −π/2, sinusoidal phase modulation 45 shown between points b and c of FIG. 14a is again biased at a linear part 52 of interferogram 51. However, slope 53 of interferogram 51 at −π/2 is opposite to slope 52 of interferogram 51 at +π/2, therefore optical intensity signal 54 shown between points b and c of FIG. 14c appears to be approximately an inverted version of the optical intensity signal 55 shown between points a and b of FIG. 14c.

Since sinusoidal phase modulation 45 is not exactly at twice the frequency of square-wave bias modulation 50, then optical intensity signal 54 shown between points b and c of FIG. 14c is not exactly a sign inverted version of optical intensity signal 55 shown between points a and b of FIG. 14c. This illustrates qualitatively how sinusoidal modulation 45 interacts with the bias modulation 50 to produce a signal that can be demodulated into a rotation sensing error. A simple method of square demodulation consist of: (i) finding the average value for optical intensity signal 55 shown between points a and b of FIG. 14c and the average value for optical intensity signal 54 shown between points b and c of FIG. 14c, then (ii) finding the difference between the two average values. Under no rotation, the difference between the two average values should be zero. However, the sinusoidal part of the optical signals 54 and 55 do not have the same average, therefore will result in a non-zero demodulator output, which is a false indication of rotation.

Sinusoidal signals 56 and 57 shown between points c and e of FIG. 14c (corresponding to the $i^{th}+1$ bias modulation cycle) are different then the optical intensity signals shown between points a and c of FIG. 14c (corresponding to the $i^{th}$ bias modulation cycle), therefore the rotation sensing error produced at the $i^{th}+1$ bias modulation cycle will be different than the rotation sensing error produced at the $i^{th}$ bias modulation cycle. This shows qualitatively that the rotation sensing error resulting from sinusoidal modulation near the second harmonic of the bias modulation frequency will vary with time.

Figure 15:
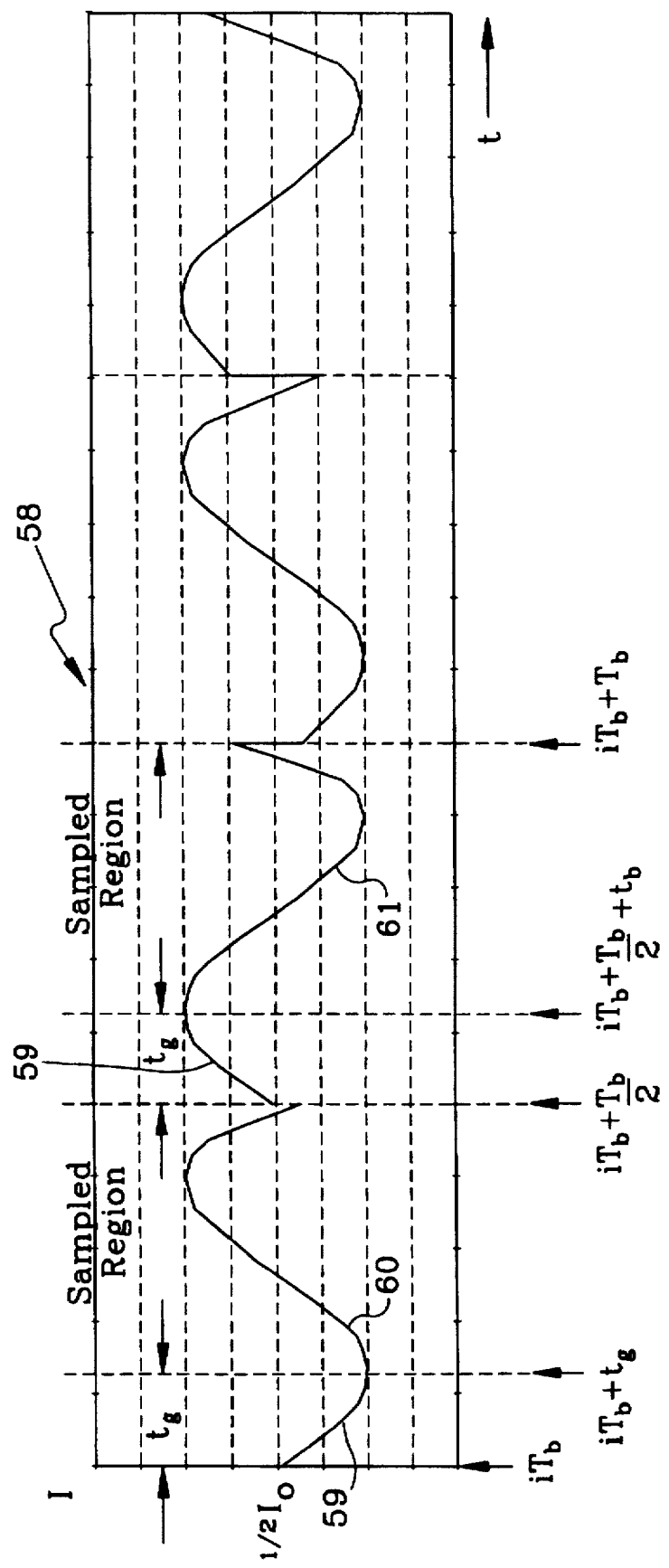
FIG. 15 shows a sinusoidal optical signal produced by phase modulation for carrier suppression of backscatter in an open loop gyroscope under no rotation.

FIG. 15 illustrates how the demodulation process is modeled to quantitatively determine the rotation sensing error due to carrier suppression modulation. The typical demodulation process employed in IFOGs consist of sampling the photodetector signal with an analog-to-digital converter (ADC), then performing the signal processing with digital electronics. Not all of the samples are used in the demodulation process. The bias modulation 50 transitions between $\pm\pi/2$ causes sharp glitches (not shown in FIG. 15) in optical intensity signal 58 at times $iT_b$, $iT_b+T_b/2$, $iT_b+T_b$, etc. In order to reject a rotation sensing error due to the sharp glitches, samples 59 that occur during a gating time $t_g$ are not used in the demodulation process. Samples 60 between $iT_b+t_g$ and $iT_b+T_b/2$ are summed to produce a value that is proportional to the average value of the signal corresponding to the first half cycle of the $i^{th}$ bias modulation cycle. Then samples 61 between $$iT_b + \frac{T_b}{2} + t_g$$

and $iT_b+T_b$ are summed to produce a second value that is proportional to the average value of the signal corresponding to the second half cycle of the $i^{th}$ bias modulation cycle. The demodulated signal (which is proportional to the rotation rate) is the difference between the two summed values. The demodulation process is performed for successive bias modulation cycles.

To model the effects of the square-wave bias modulation 50 the intensity output I of the Sagnac interferometer is expressed in two equations.

$$I = \frac{1}{2} I_0 \begin{cases} 1+\cos\left[\frac{\pi}{2}+\Delta\phi_n\sin|(n\omega_b+\Delta\omega)t|\right], \\ iT_b \leq t \leq (2i+1)\frac{T_b}{2} \\ 1+\cos\left[-\frac{\pi}{2}+\Delta\phi_n\sin|(n\omega_b+\Delta\omega)t|\right], \\ (2i+1)\frac{T_b}{2} \leq t \leq (i+1)T_b \end{cases} \quad (96)$$

where n=2,4,6 ... and i=1,2,3 .... The bias modulation is represented by the values $\pi/2$ and $-\pi/2$. $\Delta\Phi_n$ is the amplitude of the sinusoidal phase modulation difference between the counter-propagating light waves, and the angular frequency of the sinusoidal modulation ($n\omega_b+\Delta\omega$) is shown to be some small difference $\Delta\omega$ away from the $n^{th}$ harmonic (where n is even) of the bias modulation angular frequency $\omega_b$. $T_b$ is the period of bias modulation 50 and i refers to which bias modulation cycle is being considered. Here, one assumes that the bias modulation 50 frequency is set exactly to the eigen frequency of the Sagnac interferometer.

By assuming no input rotation and that $\Delta\Phi_n$ is small, one can simplify Eq. 96 by making a small angle approximation.

$$I \cong \frac{1}{2} I_0 \begin{cases} 1-\Delta\phi_n\sin|(n\omega_b+\Delta\omega)t|, \\ iT_b \leq t \leq (2i+1)\frac{T_b}{2} \\ 1+\Delta\phi_n\sin|(n\omega_b+\Delta\omega)t|, \\ (2i+1)\frac{T_b}{2} \leq t \leq (i+1)T_b \end{cases} \quad (97)$$

To model the demodulation process, the intensity signal is integrated piecewise for a part of each half period of the bias modulation 50. Since one assumes that there is no rotation, the demodulated signal is an error signal $S_{error}$.

$$S_{error} \equiv k \left\{ \int_{iT_b+t_g}^{iT_b+T_b/2} I dt - \int_{iT_b+T_b/2+t_g}^{iT_b+T_b} I dt \right\}, \quad (98)$$

where k is a constant that represents the gain of the photodetector and electronics up to and including the ADC. The integration limits include the partial sampling technique (not using all the samples of the entire waveform) or gating time $t_g$. The first integral in Eq. 98 corresponds to the first half of the $i^{th}$ bias modulation cycle and the second integral corresponds to the second half of the $i^{th}$ bias modulation cycle. The time dependence of the error signal $S_{error}$ is found by using the index i to model an arbitrary bias modulation 50 cycle.

After evaluating the integrals in Eq. 98, one substitutes the periods $T_b=2\pi/\omega_b$ and $\Delta T=2\pi/\Delta\omega$ for the angular frequencies in the result $$S_{error} = \frac{k\Delta T T_b I_0 \Delta\phi_n}{4\pi(n\Delta T+T_b)} \left\{ \cos\left(n\pi+2in\pi+\pi\frac{T_b}{\Delta T} + 2i\pi\frac{T_b}{\Delta T}\right) + \cos\left(2n\pi+2in\pi+2\pi\frac{T_b}{\Delta T}+2i\pi\frac{T_b}{\Delta T}\right) + \cos\left(2in\pi+2i\pi\frac{T_b}{\Delta T}+2\pi\frac{t_g}{\Delta T}+2n\pi\frac{t_g}{T_b}\right) + \cos\left(n\pi+2in\pi+\pi\frac{T_b}{\Delta T}+2i\pi\frac{T_b}{\Delta T}+2\pi\frac{t_g}{\Delta T}+2n\pi\frac{t_g}{T_b}\right) \right\} \quad (99)$$

One can simplify Eq. 99 using trigonometric identities.

$$S_{error} = -\frac{k\Delta T T_b I_0 \Delta \phi_n}{\pi(n\Delta T + T_b)} \cos\left(\frac{\pi}{2} \frac{T_b}{\Delta T}\right) \sin\left(\frac{\pi}{2} \frac{T_b}{\Delta T} - \right. \tag{100}$$

$$\pi \frac{t_g}{\Delta T} - n\pi \frac{t_g}{T_b}\right) \sin\left(2i\pi \frac{T_b}{\Delta T} + \frac{\pi}{2} \frac{T_b}{\Delta T} + \right.$$

$$\left. \pi \frac{t_g}{\Delta T} + n\pi \frac{t_g}{T_b}\right)$$

The sampling ratio $R_s$ is defined as the number of samples taken (or used) during a half bias modulation 50 period, after the gating time $t_g$, divided by the total possible number of samples that could be taken (or used) during a full half period of the bias modulation 50 cycle.

$$R_s \equiv 1 - \frac{2t_g}{T_b} \tag{101}$$

Substituting $t_g=(\frac{1}{2})(1-R_s)T_b$ and the frequencies $f_b=1/T_b$ and $\Delta f=1/\Delta T$ for the periods in Eq. 100 yields $$S_{error} = -\frac{k I_0 \Delta \phi_n}{\pi(nf_b + \Delta f)} \cos\left(\frac{\pi}{2} \frac{\Delta f}{f_b}\right) \sin\left(n\frac{\pi}{2} R_s + \right. \tag{102}$$

$$\left. \frac{\pi}{2} \frac{\Delta f}{f_b} R_s\right) \sin\left(2\pi\Delta f t' + \frac{3}{2} \pi \frac{\Delta f}{f_b} - n\frac{\pi}{2} R_s - \frac{\pi}{2} \frac{\Delta f}{f_b} R_s\right)$$

where the time t'

$$t' \equiv iT_b \tag{103}$$

is used to show the time dependence of $S_{error}$. Equation 102 shows that $S_{error}$ is an sinusoidal error signal that varies at a frequency of $\Delta f$. The amplitude of the error signal is $$S_{error,amp} = \tag{104}$$

$$-\frac{k I_0 \Delta \phi_n}{\pi(nf_b + \Delta f)} \cos\left(\frac{\pi}{2} \frac{\Delta f}{f_b}\right) \sin\left(n\frac{\pi}{2} R_s + \frac{\pi}{2} \frac{\Delta f}{f_b} R_s\right)$$

The phase difference amplitude $\Delta \Phi_n$ due to a carrier suppression modulation 45 is a function of the suppression modulation 45 frequency and the eigen frequency $f_e$.

$$\Delta \phi_n = 2\phi_n \sin\left(\frac{\pi}{2} \frac{\Delta f}{f_e}\right) \tag{105}$$

where $\Phi_n$ is the phase modulation amplitude of the light wave making a single pass through phase modulator 42. In this analysis, one assumes that the bias modulation 50 frequency was set to the eigen frequency.

$$f_b = f_e \tag{106}$$

Substituting Eqs. 105 and 106 into Eq. 104, one gets $$S_{error,amp} = \tag{107}$$

$$\frac{k I_0 \phi_n}{\pi(nf_b + \Delta f)} \sin\left(\pi \frac{\Delta f}{f_b}\right) \sin\left(n\frac{\pi}{2} R_s + \frac{\pi}{2} \frac{\Delta f}{f_b} R_s\right)$$

It is desireable to find the error in terms of rotation rate. To do this, one first finds the transfer function (open-loop scale factor) relating the signal due to a rotation rate to the phase difference caused by the rotation rate. It is important that the model of the demodulation of the rotation signal includes the partial sampling scheme. One also assumes that the carrier suppression modulation 45 does not significantly affect the open loop scale factor, therefore one does not include the sinusoidal modulation 45 in this calculation. The optical intensity $I_{rotation}$ from the Sagnac interferometer under rotation is $$I_{rotation} = \frac{1}{2} I_0 \begin{cases} 1 + \cos\left[\frac{\pi}{2} + \Delta \phi_{rotation}\right], \\ \quad iT_b \leq t \leq (2i+1)\frac{T_b}{2} \\ 1 + \cos\left[-\frac{\pi}{2} + \Delta \phi_{rotation}\right], \\ \quad (2i+1)\frac{T_b}{2} \leq t \leq (i+1)T_b \end{cases} \tag{108}$$

where $\Delta \Phi_{rotation}$ is the phase difference caused by the rotation. The demodulated signal is found by performing the following integration.

$$S_{rotation} \equiv k \int_{iT_b + t_g}^{iT_b + T_b/2} I_{rotation} dt - \int_{iT_b + T_b/2 + t_g}^{iT_b + T_b} I_{rotation} dt \tag{109}$$

After making similar substitutions that were done for the analysis of the error signal, and making a small angle approximation, one gets for Eq. 109.

$$S_{rotation} \equiv \left[-\frac{k I_0 R_s}{2f_b}\right] \Delta \phi_{rotation} \tag{110}$$

Equation 110 shows how much rotation signal $S_{rotation}$ is generated by a phase difference $\Delta \Phi_{rotation}$ caused by rotation. The open-loop scale factor is all the coefficients within the brackets in Eq. 110. One defines the phase difference $\Delta \Phi_{rotation\ error}$ $$S'_{error,amp} \equiv \left[-\frac{k I_0 R_s}{2f_b}\right] \Delta \phi_{rotation\ error} \tag{111}$$

as the phase difference induced by a rotation rate $\Omega_{rotation\ error}$ that will produce a demodulated signal $S'_{error,amp}$, that is equal to the error signal $S_{error,amp}$ caused by the sinusoidal phase modulation. By definition $$S'_{error,amp} \equiv S_{error,amp}. \tag{112}$$

Using these definitions and the approximation $$\frac{1}{\frac{\Delta f}{f_b} + n} \cong \frac{1}{n} \tag{113}$$

one gets for $\Delta \Phi_{rotation\ error}$ $$\Delta \phi_{rotation\ error} \equiv \tag{114}$$

$$\frac{2\phi_n}{n\pi R_s} \sin\left(\pi \frac{\Delta f}{f_b}\right) \sin\left(n\frac{\pi}{2} R_s + \frac{\pi}{2} \frac{\Delta f}{f_b} R_s\right).$$

By finding the error in terms of phase difference, one removes the coefficients found in the open-loop scale factor and this analysis becomes relevant to a FOG operating in closed-loop configuration. The phase difference due to a rotation is given by $$\Delta \phi_{rotation\ error} = \frac{2\pi LD}{\lambda c} \Omega_{rotation\ error} \tag{115}$$

where L is the length of sensing coil fiber 12, D is the diameter of sensing coil 12, $\lambda$ is the wavelength of the light and c is the speed of light in a vacuum. Combining Eqs. 114 and 115, one gets $$\Omega_{\text{rotation error}} = \tag{116}$$

$$\frac{\lambda c}{2\pi L D} \frac{2\phi_n}{n\pi R_s} \sin\left(\pi \frac{\Delta f}{f_b}\right) \sin\left(n\frac{\pi}{2} R_s + \frac{\pi}{2} \frac{\Delta f}{f_b} R_s\right)$$

which shows the rotation sensing error due to a carrier suppression modulation 45. Equation 118 shows that the error can be minimized by choosing an optimum values for $R_s$ and n. If one sets the design constraint $$\frac{nR_s}{2} = \text{integer} \tag{117}$$

then Eq. 116 becomes $$\Omega_{\text{rotation error}} = \frac{\lambda c}{2\pi L D} \frac{2\phi_n}{n\pi R_s} \sin\left(\pi \frac{\Delta f}{f_b}\right) \sin\left(\frac{\pi}{2} \frac{\Delta f}{f_b} R_s\right) \tag{118}$$

which now can be made small by making $\Delta f$ small. The design constraint shown in Eq. 117 can be satisfied by first setting $R_s$ by other design constraints, then setting n to satisfy Eq. 117 by choosing the appropriate carrier suppression frequency. If this is done, then Eq. 118 shows that $\Omega_{\text{rotation error}}$ will approach zero very quickly when $\Delta f$ is adjusted towards zero.

Figure 16:
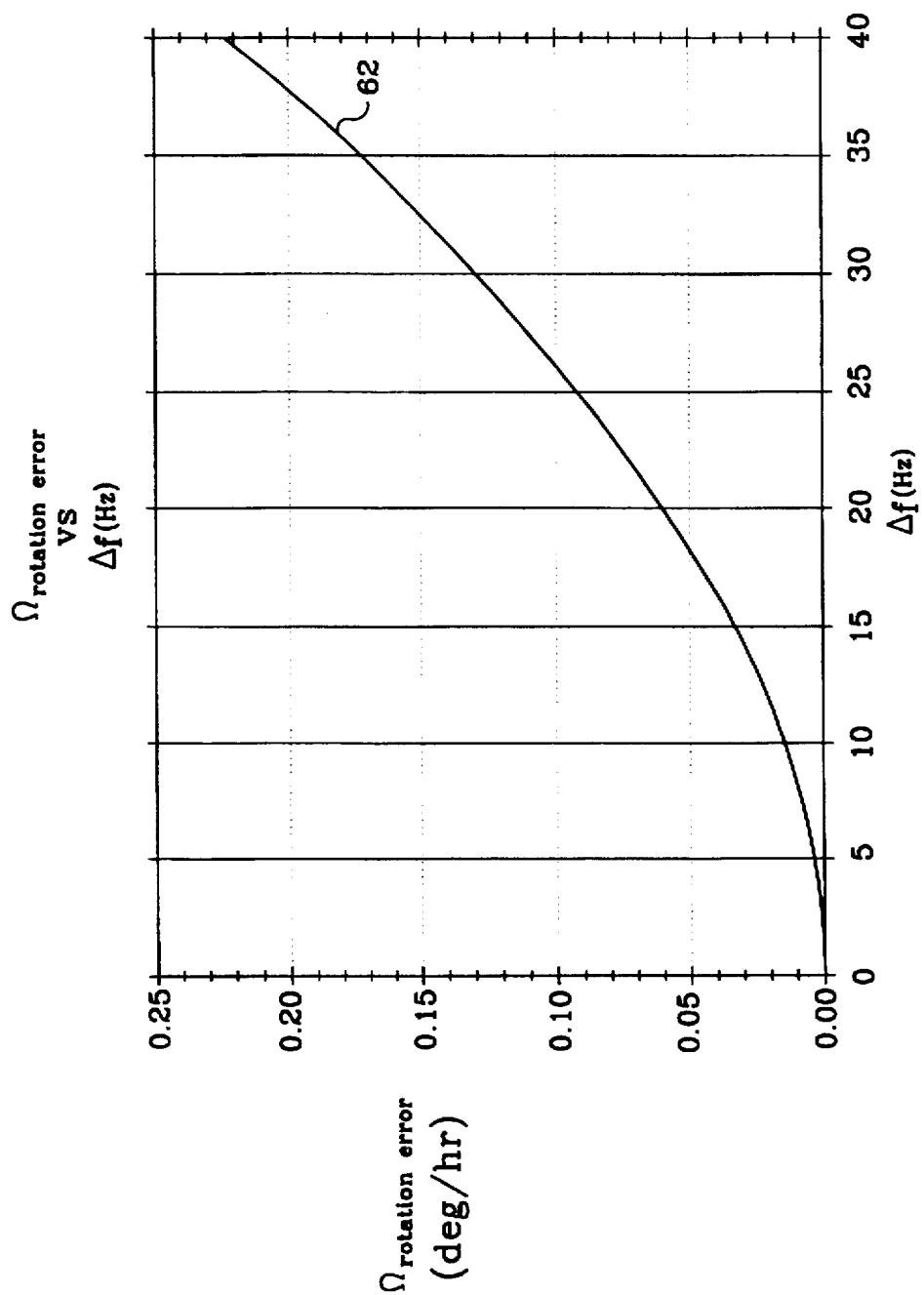
FIG. 16 is a plot of rotation error versus the difference in frequencies of the carrier suppression phase modulation and the bias phase modulation.

FIG. 16 shows a plot 62 of $\Omega_{\text{rotation error}}$ vs $\Delta f$ for: $\lambda=1.55$ µm, $c=3\times10^8$ ms$^{-1}$, L=4 km , D=0.15 m, $$R_s = \frac{7}{8},$$

n=16, $f_b$=25 kHz, $\Phi_n$=2.25, which are typical values for a high performance IFOG. For this example, the carrier suppression modulation 45 frequency is set to approximately the $16_{th}$ harmonic (n=16) , which satisfies the design constraint shown in Eq. 117.

To determine the level at which sinusoidal error $\Omega_{\text{rotation error}}$ becomes acceptable, one needs to consider other rotation sensing errors. One rotation sensing error always present in an IFOG is angle random walk (ARW), which is a stochastic error (or noise). The rate uncertainty $\Omega_{ARW}$ due to ARW is define as $$\Omega_{ARW} \equiv ARWC\sqrt{\frac{2}{\tau}} \tag{119}$$

where ARWC is angle random walk coefficient and $\tau$ is integration time for a cluster analysis. Cluster analysis is a common method used for determining the various types of error coefficients of a gyro. One assumes that $\Omega_{\text{rotation error}}$ is insignificant if it is always less than $\Omega_{ARW}$. For a cluster analysis, a sinusoidal error will have a maximum effect when the integration time is approximately ½ the period of the sinusoidal error. Therefore, one can write an equation that defines the integration time $\tau_{max}$ (in units of hours), where $$\tau_{max} \equiv \frac{1}{2} \Delta T \left(\frac{hr}{3600s}\right) \tag{120}$$

that gives the maximum effect due to the sinusoidal error $\Omega_{\text{rotation error}}$ having a period $\Delta T$ (in units of seconds). Combining Eqs. 119 and 120, and substituting $1/\Delta f$ for $\Delta T$, one gets the rate uncertainty $\Omega_{ARW,max}$ (as defined by a cluster analysis)

$$\Omega_{ARW,max} \equiv 120\sqrt{\frac{s}{hr}} \; ARWC\sqrt{\Delta f} \tag{121}$$

that occurs at an integration time $\tau_{max}$, which is a function of $\Delta f$.

Figure 17:
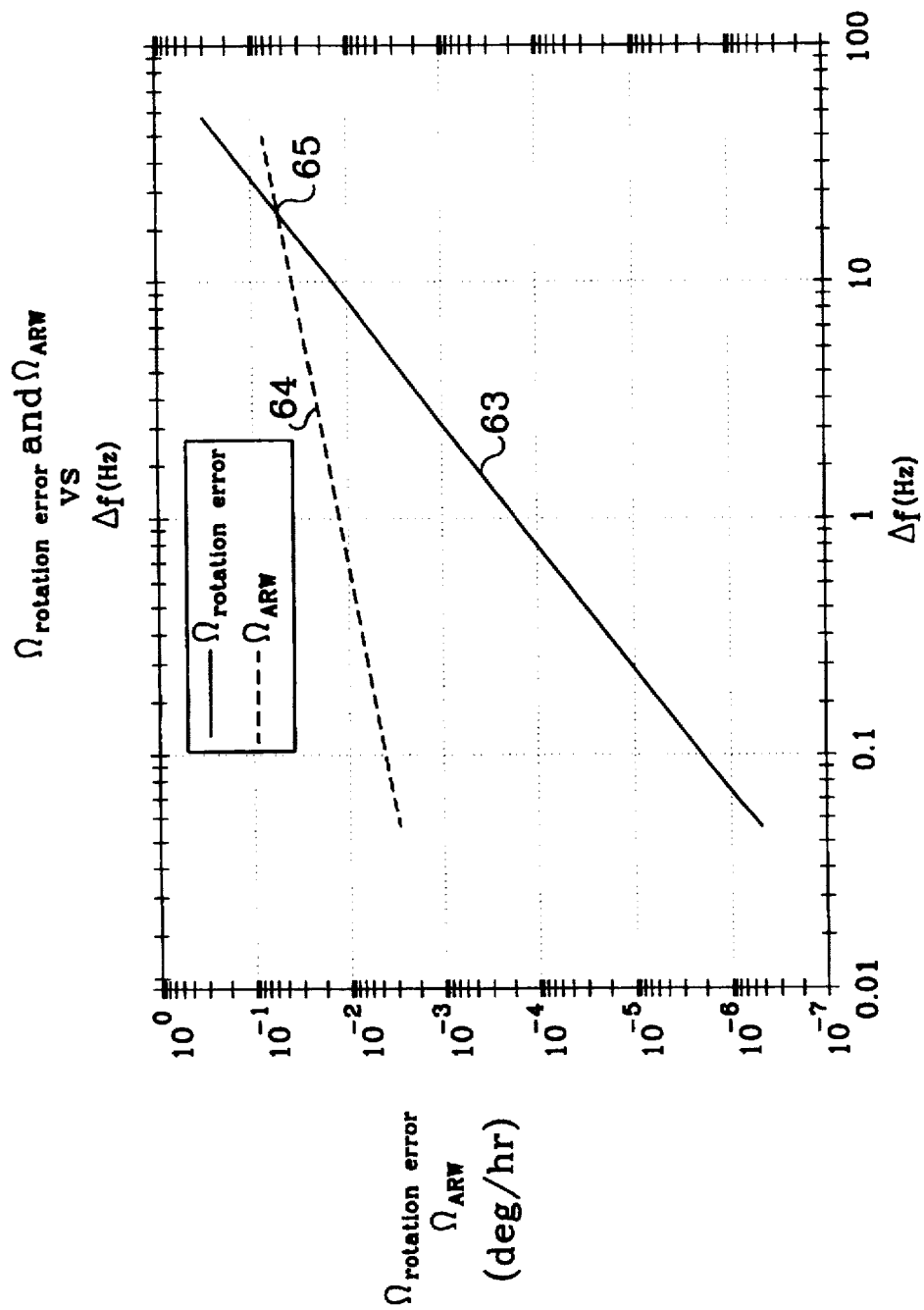
FIG. 17 shows plots of rotation rate error and angle random walk, respectively, versus the difference in frequencies of the carrier suppression phase modulation and the bias phase modulation.

FIG. 17 shows plots 63 and 64, respectively of $\Omega_{\text{rotation error}}$ and $\Omega_{ARW,max}$ vs $\Delta f$. Plots 63 and 64 show that $\Omega_{\text{rotation error}} < \Omega_{ARW,max}$ when $\Delta f < 18$ Hz. Point 65 shows that $\Delta f$ should be less than 18 Hz so that $\Omega_{\text{rotation error}}$ is less than the gyro noise output $\Omega_{ARW,max}$. Therefore, for this example, if carrier suppression frequency 45 is set to 16 times the bias modulation frequency 50 (which is at the eigen frequency) plus or minus 18 Hz or less, then the sinusoidal rate error caused by carrier suppression modulation 45 will be less than the rate noise output of the IFOG. If one reduces $\Delta f$ to about 1 Hz, then the sinusoidal error is about 100 times less than the rate noise output of the IFOG. At this level, the sinusoidal error should be insignificant for all systems using an IFOG employing carrier suppression modulation.

In summary, Rayleigh backscatter from IOC 21 waveguides 36 and 37 may cause significant rotation sensing errors in IFOGs operating at all source 14 wavelengths. Navigation grade IFOGs operating near source 14 wavelengths of 0.83 µm may have significant rotation sensing errors due to backscatter from loop fiber 12. The backscatter error can be substantially reduced by applying a carrier suppression phase modulation 45 to one of the primary waves in loop 12. The manner in which the suppression modulation 45 is applied greatly determines overall performance of the error reduction technique.

Suppression modulation 45 at a frequency much less than the proper frequency will generate an unwanted AC signal at the gyro output. Even though this signal could be subtracted from the output, it would be very difficult to reduce the AC signal below the level of normal random fluctuations of the gyro output. Suppression modulation 45 at a frequency that is near even multiple integers of the proper frequency will also generate an unwanted AC signal. However, the amplitude of the unwanted AC signal can be reduced below the level of normal gyro output fluctuations if the frequency of the suppression modulation 45 is set near even multiple integers of 8 or greater of the proper frequency.

The placement of the phase modulators 42, 43, 44, used for bias 23, 50 and suppression 45 modulation have a significant impact on the level of backscatter error reduction obtained with suppression modulation 45. If phase modulators 42 and 43 are on separate waveguides 36 and 37 and are placed opposite to each other, then suppression modulation 45 will reduce the backscatter error by about a factor of 10. To reduce the backscatter error by more than a factor of 10, two design enhancements can be employed: an additional suppression modulation at a different frequency can be applied, and/or a suppression phase modulator 44 can be placed before bias phase modulator 43.

Optical time delays associated with the long loop 12 lengths also have a significant effect on the level of reduction of errors associated with backscatter from loop fiber 12. If the frequency of the suppression modulation 45 is set greater than the proper frequency, then suppression modulation 45 will reduce the backscatter error by about a factor of 5. To obtain a higher error reduction factor, multiple carrier suppression modulations at different frequencies can be used.

Further, bias modulation 50 signal may be a square wave rather than a sine wave. The design criterion for an IFOG employing square-wave modulation/demodulation and carrier suppression modulation is that the ratio $(nR_s)/2$ must be an integer and that $\Delta f$ must be small enough such that the sinusoidal rate error produced by the carrier suppression modulation 45 is less than the gyro random noise output at an integration time where the sinusoidal error has a maximum effect.

We claim:

1. A backscatter error reducer for an interferometric fiber optic gyroscope, comprising:

first source means for providing primary waves of light;

a splitting means, connected to said first source means, for splitting the primary waves of light into first and second beams of primary waves of light;

optical fiber loop means, connected to said splitting means, for receiving the first beam of primary waves of light that propagates through said optical fiber loop means in a clockwise direction, and receiving the second beam of primary waves of light that propagates through said optical fiber loop in a counterclockwise direction;

detecting means, situated proximate to said splitting means, for detecting the first and second beams of primary waves of light that are received and converting phase relationships among the waves of light into rotation rate information;

second source means for providing a first phase modulation signal having a first amplitude and a first frequency;

third source means for providing a second phase modulation signal having a second amplitude that is sufficient for removing backscatter induced rotation rate sensing error from the rotation rate information of the detector and a second frequency that is approximately equal to a harmonic of a proper frequency of the sensing loop; and modulator means, connected to said splitting means, for phase modulating at least one beam of the first and second beams of light, in accordance with the first and second phase modulation signals.

2. The backscatter error reducer of claim 1, wherein the second amplitude of the second phase modulation signal is at least one radian.

3. The backscatter error reducer of claim 2, wherein the second frequency is approximately equal to an even harmonic of a proper frequency of the sensing loop.

4. A backscatter error reducer for an interferometric fiber optic gyroscope, comprising:

first source means for providing primary waves of light;

splitting means, connected to said first source means, for splitting the primary waves of light into first and second beams of primary waves of light and causing secondary waves of light from the primary waves of light;

optical fiber loop means, connected to said splitting means, for receiving the first beam of primary waves that propagates through said optical fiber loop means in a clockwise direction, for receiving the second beam of primary waves that propagates through said optical fiber loop means in a counterclockwise direction, causing secondary waves of light from the first and second beams of primary waves of light;

second source means for providing a first phase modulation signal having a first amplitude;

third source means for providing a second phase modulation signal having a second amplitude that is sufficient for removing backscatter or secondary wave induced rotation rate sensing error and a frequency that is near or approximately equal to an even harmonic of a proper frequency of said sensing loop; and modulator means, connected to said splitting means, for phase modulating at least one beam of the first and second beams of primary waves and the secondary waves of light, in accordance with the first and second phase modulation signals.

5. The backscatter error reducer of claim 4, wherein the second amplitude of the second phase modulation signal has an amplitude of at least one radian.

6. The backscatter error reducer of claim 5, wherein the even harmonic is one that minimizes second phase modulation signal induced or periodic rotation rate sensing output error.

7. A backscatter error reducer for an interferometric fiber optic gyroscope, comprising:

first source means for providing pairs of first and second primary waves of light;

splitting means for splitting the pairs of first and second primary waves of light into a first beam of first primary waves of light and a second beam of second primary waves of light and for receiving and combining the pairs of first and second primary waves of light;

Sagnac loop means having first and second waveguides connected to said splitting means and an optical fiber loop having first and second ends connected to the first and second waveguides, respectively, for receiving the first beam of first primary waves through the first waveguide and the first end wherein the first beam propagates clockwise through the optical fiber loop and out of the second end and through the second waveguide to said splitting means, and for receiving the second beam of second primary waves through the second waveguide and the second end wherein the second beam propagates counterclockwise through the optical fiber loop and out of the first end and through the first waveguide to said splitting means, wherein the first beam of first primary waves causes in said Sagnac loop means a first group of first secondary waves to propagate counterclockwise in the sensing loop, and the second beam of second primary waves causes in said Sagnac loop means a second group of second secondary waves to propagate clockwise in the sensing loop;

second source means for providing a first phase modulation signal having a first frequency and a first amplitude, said first frequency being near or approximately equal to an even harmonic of a proper frequency of the Sagnac loop; and modulator means, connected to said Sagnac loop means, for phase modulating first and second beams and the first and second groups of secondary waves in accordance with the first phase modulation signal.

8. The backscatter error reducer of claim 7, wherein the first amplitude of the first phase modulation signal is sufficient to nearly eliminate any interference of the secondary waves at the splitting means.

9. The backscatter error reducer of claim 8, further comprising:

third source means for providing a second phase modulation signal having a second frequency and a second amplitude to said modulator means; and wherein said modulator means comprises:

a first phase modulator, connected to said second source means, situated so as to modulate waves of light propagating through the first waveguide; and a second phase modulator, connected to said third source means, situated so as to modulate waves of light propagating through the second waveguide.

10. The backscatter error reducer of claim 9, wherein said modulator means further comprises a third modulator, connected to said second source means, situated so as to modulate waves of light propagating through the first waveguide.

11. The backscatter error reducer of claim 10, wherein said third modulator is an offset modulator situated between said splitting means and the first modulator.

12. The backscatter error reducer of claim 10, wherein:

each of the first group of secondary waves corresponds to each of the second group of secondary waves to form a pair of secondary waves each of which originate from sections at equivalent optical distances from said splitting means; and the first amplitude of said first phase modulation signal is of amplitude such that said modulator means generates a minimum of one radian of phase modulation difference between the secondary waves of each pair of secondary waves.

13. The backscatter error reducer of claim 7, wherein the proper frequency or eigen frequency of the Sagnac loop is equal to one divided by two tau, wherein:

tau is the transit time of a wave of light traveling once through the Sagnac loop; and tau is equal to the index of refraction of the Sagnac loop multiplied by the length of the Sagnac loop, and divided by the speed of light.

14. The backscatter error reducer of claim 13, wherein the even harmonic is one that minimizes second modulator signal induced sinusoidal or periodic rotation rate output error.

15. The backscatter error reducer of claim 14, wherein:

the first phase modulation signal is a carrier suppression modulation signal; and the second phase modulation signal is a bias modulation signal.

16. A backscatter error reducer for an interferometric fiber optic gyroscope, comprising:

a light source;

a splitter connected to said light source, the splitter comprising a first output and a second output;

a first phase modulator connected to said first output of said splitter;

a sensing loop connected to said first modulator and said splitter;

a first signal generator connected to said first phase modulator; and wherein:

primary waves of light from said light source counter-propagate in said sensing loop;

non-primary waves of light are reflected out of said sensing loop to said splitter;

the non-primary waves of light interfere in said splitter and cause rotation sensing error; and said first signal generator outputs a modulation signal having a frequency that is approximately equal to or near a harmonic of a proper frequency of the sensing loop.

17. The backscatter error reducer of claim 16, further comprising:

a second phase modulator connected to said second output of said splitter; and a second signal generator connected to said second phase modulator; and wherein the second signal generator provides a bias phase modulation signal to said second phase modulator.

18. The backscatter error reducer of claim 17, wherein:

said bias phase modulation signal has an approximately square wave; and the modulation signal from said first signal generator has an approximately sinusoidal wave.

19. The backscatter error reducer of claim 17, wherein the modulation signal from said first signal generator has an amplitude of at least one radian.

* * * * *

UNITED STATES PATENT AND TRADEMARK OFFICE
CERTIFICATE OF CORRECTION

PATENT NO. : 5,781,300
DATED : July 14, 1998
INVENTOR(S) : Strandjord et al.

It is certified that error appears in the above-identified patent and that said Letters Patent is hereby corrected as shown below:

On the title page, Item [75] under inventor's
  please change "Scottsdale, Ark." to -- Scottsdale, Ariz. --
  please change "Cave Creek, Ark." to -- Cave Creek, Ariz. --.
  please change "Phoenix, Ark." to --Phoenix, Ariz. --.

Signed and Sealed this

Sixth Day of March, 2001

Attest:

NICHOLAS P. GODICI

Attesting Officer    Acting Director of the United States Patent and Trademark Office